US012579371B2

(12) United States Patent (10) Patent No.: US 12,579,371 B2
Arumae et al. (45) Date of Patent: Mar. 17, 2026

(54) USING MACHINE LEARNING TO GENERATE SEGMENTS FROM UNSTRUCTURED TEXT AND IDENTIFY SENTIMENTS FOR EACH SEGMENT

(71) Applicant: Qualtrics, LLC, Provo, UT (US)

(72) Inventors: Kristjan Arumae, Seattle, WA (US); Zheng Zheng Xing, Bellevue, WA (US); Recep Colak, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 190 days.

(21) Appl. No.: 18/327,780

(22) Filed: Jun. 1, 2023

(65) Prior Publication Data

US 2024/0403565 A1 Dec. 5, 2024

(51) Int. Cl.
G06F 40/35 (2020.01)
G06F 40/205 (2020.01)
G06F 40/284 (2020.01)
(52) U.S. Cl.
CPC ............ G06F 40/35 (2020.01); G06F 40/205 (2020.01); G06F 40/284 (2020.01)
(58) Field of Classification Search
None
See application file for complete search history.

(56) References Cited

U.S. PATENT DOCUMENTS 10,878,505 B1 * 12/2020 Blair ...................... G06V 10/82
10,937,446 B1 * 3/2021 Wong ..................... G06N 3/044

12,099,802 B1 * 9/2024 Petrauskas .............. G06F 40/30
2019/0042557 A1 * 2/2019 Okubo ................... G06F 40/253
2020/0151777 A1 * 5/2020 Casalino ............ G06Q 30/0282
2021/0019803 A1 * 1/2021 Khaderbad ........ G06Q 30/0203
2022/0147770 A1 * 5/2022 Jain ........................ G06F 40/117
2022/0229984 A1 * 7/2022 Miao ...................... G06N 3/045
2022/0319535 A1 * 10/2022 Chawla .............. G10L 21/0272
2023/0057706 A1 * 2/2023 Malak ..................... G06F 40/20
2023/0112589 A1 * 4/2023 Kanagovi ................ G06N 3/08
707/739

(Continued)

OTHER PUBLICATIONS

Yang, Peng, and Yunfang Chen. "A survey on sentiment analysis by using machine learning methods." 2017 IEEE 2nd Information Technology, Networking, Electronic and Automation Control Conference (ITNEC). IEEE, 2017. (Year: 2017).*

(Continued)

*Primary Examiner* — Douglas Godbold
(74) *Attorney, Agent, or Firm* — Keller Preece PLLC

(57) ABSTRACT

The present disclosure relates to systems, non-transitory computer-readable media, and methods for segmenting unstructured text into salient portions and identifying sentiments expressed in each segment. In particular, the disclosed systems utilize a segmentation machine learning model to segment unstructured text into salient portions and a sentiment identifying machine learning model to identify sentiments for each segment. Additionally, the disclosed systems determine a topic for each segment and associate it with an emotion label, a sentiment label or a predicted action label. In one or more embodiments, based on the topic associated with the emotional label, sentiment label or predicted action label, the disclosed systems determine and perform additional actions.

20 Claims, 12 Drawing Sheets

(56)                    References Cited

U.S. PATENT DOCUMENTS

| | | | | |
|---|---|---|---|---|
| 2023/0116515 A1* | 4/2023 | Kanagovi | ............ | G06F 40/295 |
| | | | | 704/9 |
| 2023/0154172 A1* | 5/2023 | Wasnik | ................. | G06V 10/82 |
| | | | | 382/157 |
| 2023/0214848 A1* | 7/2023 | Sivaswamy | ......... | G06Q 30/018 |
| | | | | 705/317 |
| 2023/0325604 A1* | 10/2023 | Gupta | .................... | G06F 40/20 |
| | | | | 704/9 |
| 2023/0410682 A1* | 12/2023 | Dhamecha | ............ | G06F 40/279 |
| 2024/0127804 A1* | 4/2024 | Shirodkar | ............. | G06F 40/284 |
| 2024/0177183 A1* | 5/2024 | Miguel | ................... | G06F 40/30 |
| 2024/0232765 A1* | 7/2024 | Austraat | ................ | G06F 40/30 |
| 2024/0249085 A1* | 7/2024 | UzZaman | ............. | G06Q 50/01 |

OTHER PUBLICATIONS

Arkaitz Zubiaga et al., "Content-based Clustering for Tag Cloud Visualization", Conference Paper, Jul. 2009, DOI: 10.1109_ASONAM. 2009.19.

Chloé Braud et al., "Cross-lingual and cross-domain discourse segmentation of entire documents", Proceedings of the 55th Annual Meeting of the Association for Computational Linguistics (ShortPapers), pp. 237-243 Vancouver, Canada, Jul. 30-Aug. 4, 2017.

Chloé Braud et al., "Does syntax help discourse segmentation? Not so much", Proceedings of the 2017 Conference on Empirical Methods in Natural Language Processing, pp. 2432-2442, Copenhagen, Denmark, Sep. 7-11, 2017.

Daniel Ramage et al., "Labeled LDA: A supervised topic model for credit attribution in multi-labeled corpora", Computer Science Department, Stanford University, Proceedings of the 2009 Conference on Empirical Methods in Natural Language Processing, pp. 248-256, Singapore, Aug. 6-7, 2009.

David Bamman et al., "Learning Latent Personas of Film Characters", School of Computer Science, Carnegie Mellon University, Proceedings of the 51st Annual Meeting of the Association for Computational Linguistics, pp. 352-361, Sofia, Bulgaria, Aug. 4-9, 2013.

Hugo Hernault et al., "A Sequential Model for Discourse Segmentation", CICLing 2010: Computational Linguistics and Intelligent Text Processing pp. 315-326, Mar. 2010.

Jiacheng Xu et al., "Discourse-Aware Neural Extractive Text Summarization", The University of Texas at Austin, Microsoft Dynamics 365 AI Research, Proceedings of the 58th Annual Meeting of the Association for Computational Linguistics, pp. 5021-5031, Jul. 5-10, 2020.

Lynn Carlson et al., "RST Discourse Treebank", webpage <https://catalog.ldc.upenn.edu/LDC2002T07>, 1 page, Philadelphia: Linguistic Data Consortium, Feb. 21, 2002.

Maria Pontiki et al., "SemEval-2016 Task 5, Task 5: Aspect-Based Sentiment Analysis", webpage <https://alt.qcri.org/semeval2016/task5/>, 11 pages, last updated Feb. 16, 2016.

Michael Heilman et al., "Fast Rhetorical Structure Theory Discourse Parsing", Computation and Language (cs.CL), May 10, 2015, 6 pages, https://doi.org/10.48550/arXiv.1505.02425.

Michael Lukasik et al., "Text Segmentation by Cross Segment Attention", Google Research, Dec. 7, 2020, 10 pages, arXiv:2004. 14535v2.

Milan Tofiloski et al., "A Syntactic and Lexical-Based Discourse Segmenter", Proceedings of the ACL-IJCNLP 2009 Conference Short Papers, pp. 77-80, Suntec, Singapore, Aug. 4, 2009.

Nikunj Oza, "Text Mining 2007, SIAM 2007 Text Mining Competition dataset", webpage <https://c3.ndc.nasa.gov/dashlink/resources/138/>, 3 pages, updated on Sep. 22, 2010.

Patrick Huber et al., "Unsupervised Learning of Discourse Structures using a Tree Autoencoder", Department of Computer Science, University of British Columbia, Association for the Advancement of Artificial Intelligence (www.aaai.org), Dec. 17, 2020, 11 pages, arXiv:2012.09446v1.

Philippe Muller et al., "ToNy: Contextual embeddings for accurate multilingual discourse segmentation of full documents", Proceedings of the Workshop on Discourse Relation Parsing and Treebanking 2019, Jun. 2019, Minneapolis, United States. pp. 115-124, 10.18653/v1/W19-2715.hal-02374091.

Radu Soricut et al., "Sentence Level Discourse Parsing using Syntactic and Lexical Information", Information Sciences Institute, Proceedings of HLT-NAACL, Main Papers, pp. 149-156, Edmonton, May-Jun. 2003.

Sajad Movahedi et al., "Aspect Category Detection via Topic-Attention Network", University of Tehran, Tehran, Iran, 9 pages, Jun. 21, 2019, arXiv:1901.01183v2.

Saurav Manchanda et al., "CAWA: An Attention-Network for Credit Attribution", University of Minnesota, Nov. 26, 2019, https://doi.org/10.48550/arXiv.1911.11358.

Saurav Manchanda et al., "Text segmentation on multilabel documents a distant-supervised approach", 2018 IEEE International Conference on Data Mining (ICDM), 1170-1175, Apr. 14, 2019, 11 pages, https://doi.org/10.1109/ICDM.2018.00154.

Tao Lei et al., "Rationalizing Neural Predictions", Computer Science and Artificial Intelligence Laboratory, Massachusetts Institute of Technology, Proceedings of the 2016 Conference on Empirical Methods in Natural Language Processing, pp. 107-117, Austin, Texas, Nov. 1-5, 2016.

William Hersh et al., "Ohsumed: An Interactive Retrieval Evaluation and New Large Test Collection for Research", Proceedings of the Seventeenth Annual International ACM-SIGR Conference on Research and Development in Information Retrieval, Dublin City University, pp. 192-201, Jul. 3-6, 1994, retrieved from webpage <https://link.springer.com/chapter/10.1007/978-1-4471-2099-5_20>.

Mzhong Wang et al., "Toward Fast and Accurate Neural Discourse Segmentation", MOE Key Lab of Computational Linguistics, School of EECS, Peking University, Proceedings of the 2018 Conference on Empirical Methods in Natural Language Processing, pp. 962-967, Brussels, Belgium, Oct. 31-Nov. 4, 2018.

Zhenwen Li et al., "Composing Elementary Discourse Units in Abstractive Summarization", Key Laboratory of Computational Linguistics (MOE), Department of Computer Science, Peking University, Proceedings of the 58th Annual Meeting of the Association for Computational Linguistics, pp. 6191-6196, Jul. 5-10, 2020.

* cited by examiner

| Language | Overall Percentage Difference (F1) | Neutral Responses Performance Increase (F1) | Mixed Responses Performance Increase (F1) |
|---|---|---|---|
| English | 9.74% | 30.00% | 14.00% |
| Spanish | 8.49% | 16.13% | 25.00% |
| Japanese | 41.01% | 56.10% | 44.45% |

| Receiving User Feedback Comprising Unstructured Text | 902 |

↓

| Identifying Segments | 904 |

↓

| Generating One Or More Sentiment Labels | 906 |

1100

USING MACHINE LEARNING TO GENERATE SEGMENTS FROM UNSTRUCTURED TEXT AND IDENTIFY SENTIMENTS FOR EACH SEGMENT

BACKGROUND

Recent years have seen significant improvements in parsing text into segments of related ideas. For example, conventional systems are rule-based, naïve methods that parse text according to customary grammar and syntax rules. To illustrate, conventional systems are trained using text classified as "gold standard," and comprised of text from clean and structured formats, such as newspaper articles, Wikipedia entries, or other professional medium. Accordingly conventional systems rely on predictable features of the text and certain grammatical structures to guide where to parse out unstructured text.

Although conventional systems segment text, such systems have a number of problems in relation to accuracy, efficiency, and flexibility of operation. For instance, conventional systems are unable to accurately identify segments when text does not follow conventional grammar and spelling conventions. Respondents often provide feedback by quickly jotting down their thoughts without proofreading, hence feedback text often contains spelling errors and word fragments, doesn't follow standard grammar conventions, and/or lacks typical sentence structures. Accordingly, conventional systems quickly break down when text not reflect the clean, structured text upon which conventional systems are trained and noise from punctuation or illegible text is added.

Moreover, conventional systems are inaccurate because by they miss sentiments expressed in the text. For example, conventional systems assign a sentiment denoting an attitude or opinion expressed in an instance of text. However, a single instance of text often expresses multiple sentiments and by only assigning a single sentiment to a piece of text, conventional systems often miss sentiments in the text, missing valuable information. Moreover, since conventional systems break down when text contains mistakes or errors, conventional systems either identify sentiments that are incongruent with sentiments that are actually expressed in the text or fail to identify a sentiment altogether.

Conventional systems are also inflexible, as they cannot accurately segment text across other languages, especially when attempting to segment across languages with different structures. For example, conventional systems rely on grammar and punctuation rules for consonantal-based languages (e.g., English) that do not generalize to other languages, so conventional systems are unable to account for intuitive segmentation points in character-based or logographic-based languages (e.g., Japanese). As such, conventional systems fail to identify segmentation boundaries in character-based or logographic-based languages, resulting in various segmentation errors, such as segments containing unrelated ideas or under segmenting and generating segments that contain multiple ideas.

Moreover, conventional systems are inefficient, because in order to segment text in a variety of languages, conventional systems must use multiple machine learning models. As a result, conventional systems require large amounts of processing data in order to train multiple models in an attempt to segment text across a variety of languages. Additionally, in order to store multiple models, conventional systems require large amounts of storage capabilities. These along with additional problems and issues exist with regard to conventional systems.

BRIEF SUMMARY

Embodiments of the present disclosure provide benefits and/or solve one or more of the foregoing or other problems in the art with systems, non-transitory computer-readable media, and methods for segmenting unstructured text into salient portions and identifying sentiments expressed in each segment. In particular, the disclosed systems utilize a segmentation machine learning model to identify segments from unstructured text, where each segment comprises a salient portion of the unstructured text. By utilizing a segmentation machine learning model trained on unclean text (e.g., text that does not conform to strict grammar and spelling rules), the disclosed systems are able to identify segments from text even when the text is fragmented or contains spelling, grammar or punctuation errors. Moreover, the disclosed systems utilize a sentiment identifying machine learning model to generate a sentiment label for each segment identifying a sentiment expressed in the given segment. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 8 illustrates a diagram of performance increases of a segmentation classification system in accordance with one or more embodiments.

DETAILED DESCRIPTION

Figure 1:
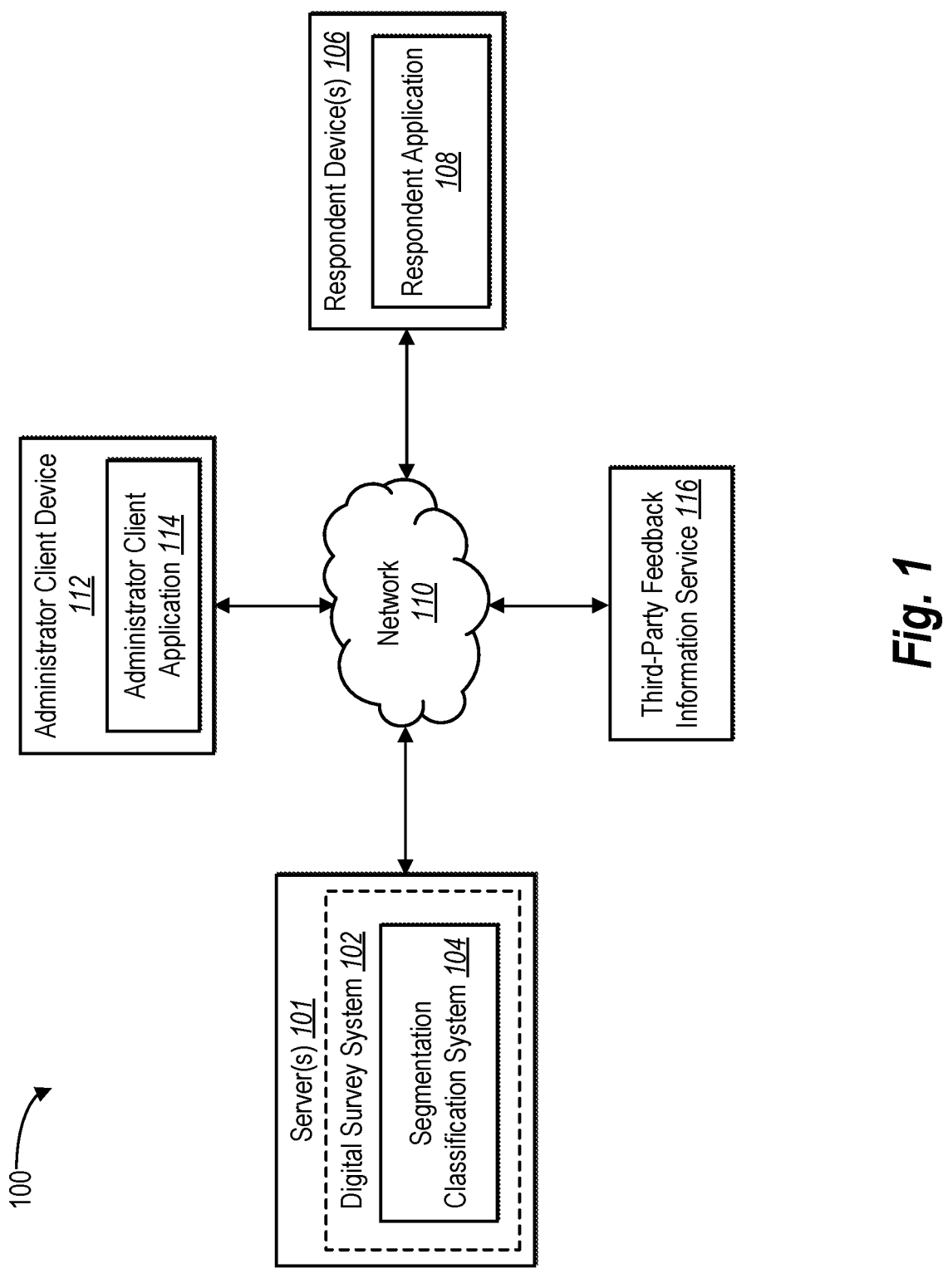
FIG. 1 illustrates a diagram of an environment in which a segmentation classification system can operate in accordance with one or more embodiments.

This disclosure describes embodiments of a segmentation classification system that utilizes machine learning to identify segments of salient portions of text from unstructured text and generate sentiment labels for each segment. In particular, the segmentation classification system can utilize a segmentation machine learning model to identify segments from the unstructured text, where each segment comprises a salient portion of the unstructured text. The segmentation classification system can then identify sentiments expressed in each segment by utilizing a sentiment identifying machine learning model to generate a sentiment label for each segment.

As mentioned, in one or more embodiments, the segmentation classification system uses a segmentation machine learning model to generate segments from unstructured text. In particular, the segmentation classification system can use a segmentation machine learning model trained to identify salient portions of unstructured text across a plurality of languages, even when the text fails to conform to conventional spelling and grammar rules. For example, the segmentation classification system can generate a training dataset comprising annotated unstructured text indicating starting points for corresponding salient portions within the unstructured text. In some embodiments, the annotated unstructured text comprises unclean text (e.g., text containing sentence fragments, errors, or other mistakes). In other embodiments, the annotated unstructured text comprises text from a plurality of languages.

Further, the segmentation classification system can access the annotated unstructured text and train the segmentation machine learning model based on the annotated unstructured text. The segmentation classification system can then provide an instance of unstructured text to the trained segmentation machine learning model, after which the segmentation classification system can receive segments comprising salient portions of the unstructured text from the trained segmentation machine learning model.

In some embodiments, the segmentation classification system identifies segments from the unstructured text by generating token labels for words in the unstructured text. In particular, the segmentation classification system can use the segmentation machine learning model to associate each word in the unstructured text with a token and then generate a token label for each token. For example, the segmentation machine learning model can generate a first token label identifying the start of a segment and a second token label identifying a portion of the given segment other than the start of the given segment.

As previously mentioned, the segmentation classification system can identify sentiments expressed in each segment. In particular, the segmentation classification system can generate a sentiment label by utilizing the sentiment identifying machine learning model to identify a sentiment label that corresponds to a sentiment expressed in the segment. For example, a sentiment label could include one of very positive, positive, neutral, negative, or very negative.

In addition to identifying sentiments, the segmentation classification system can determine or generate additional information for each segment. For example, in some embodiments, the segmentation classification system can determine a topic for each segment and associate the topic for each segment with the sentiment label for the given segment. In other embodiments, the segmentation classification system can generate an emotion label for each segment and associate the emotion label for the given segment with the topic and/or the sentiment label for the given segment. In further embodiments, the segmentation classification system can generate a predicted action based on the topic, the sentiment label, or the emotion label associated with the given segment and perform an action associated with the predicted action.

As suggested above, the segmentation classification system provides many advantages and benefits over conventional systems and methods. For example, the segmentation classification system improves the accuracy over conventional systems when segmenting unstructured text. As mentioned, conventional systems are trained on "gold standard" data that conforms to conventional spelling and grammar rules and contains very few errors. As such, conventional systems are unable to accurately identify segments in unstructured text that does not conform follow conventional grammar or dictation rules and that may also contain errors. Accordingly, in contrast to conventional systems, the segmentation classification system accurately identifies segments in unstructured text, even when the unstructured text does not conform to traditional dictation or grammar rules, or contains errors such as sentence fragments, erroneously added words, misplaced or missing punctuation, or other mistakes. In particular, by utilizing a segmentation machine learning model trained on unclean text comprising a multitude of errors, mistakes, and other noise, the segmentation classification system is able to accurately segment unstructured text into segments containing salient portions when conventional systems break down.

Additionally, the segmentation classification system improves the accuracy of generating sentiments for unstructured text. In particular, in contrast to conventional systems that generate a sentiment for an instance of unstructured text instead of a segment, the segmentation classification system generates a sentiment for each segment by first accurately segmenting unstructured text into salient portions and then identifying sentiments for each segment. Accordingly, the segmentation classification system can generate multiple sentiments for each instance of unstructured text, identifying valuable information which conventional systems fail to account for. Moreover, since the segmentation classification system accurately segments unstructured text even when there are errors and mistakes, the segmentation classification system can identify sentiments expressed unstructured text or identify segments that conventional systems fail to identify.

Furthermore, the segmentation classification system improves the flexibility over conventional systems. Specifically, the segmentation classification system can accurately segment text in a multitude of languages, in contrast to conventional systems that break down in languages that do not follow grammar and punctuation rules from the few consonantal-based languages on which conventional systems understand. For example, in contrast to conventional systems, the segmentation classification system is trained to segment text using text in a variety of languages that comprises various mistakes and errors relating to the variety of languages. Accordingly, the segmentation classification system can robustly and accurately segment unstructured text in a variety of languages, regardless of whether the data conforms to various spelling, grammar, and punctuation rules in a given language.

The segmentation classification system also improves efficiency over conventional systems. Specifically, in contrast to conventional systems that require multiple models in order to segment unstructured text in multiple languages, the segmentation classification system utilizes a single segmentation machine learning model to segment text across a variety of languages. As a result, the segmentation classification system requires vastly less processing capability and storage capability than conventional systems.

As illustrated by the foregoing discussion, the present disclosure utilizes a variety of terms to describe features and advantages of the segmentation classification system. Additional detail is now provided regarding the meaning of such terms. For example, as used herein, the term "user feedback data" refers to data comprising opinions, experiences, evaluations, or other evaluative or informative information from users. In particular, the term "user feedback data" can include input directly from users of a system, product, event, or process. To illustrate, "user feedback data" can include responses to surveys, social media posts, reviews, and chats with customer service agents.

As used herein, the term "unstructured text" refers to text that does not have a predefined format or structure. In particular, the term "unstructured text" can include text wherein a user can freely express an opinion or experience with a service, product, event, process, or good. To illustrate, "unstructured text" can include text that a user inputs in response to a survey question, or uses in a social media post, review, or in a chat with a customer service agent.

As used herein, the term "machine learning model" refers to a computer algorithm or collection of computer algorithms that automatically improve for a particular task through experience based on the use of data. For example, a machine learning model can utilize one or more learning techniques to improve accuracy and/or effectiveness. Example machine learning models include various types of decision trees, support vector machines, Bayesian networks, or neural networks.

In some embodiments, a machine learning model can be a neural network. The term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include cross-lingual neural language models, a convolutional neural network, a recurrent neural network (e.g., an LSTM), a graph neural network, a self-attention Transformer neural network, or a generative adversarial neural network.

In other embodiments, a machine learning model comprises a segmentation machine learning model. As used herein, the term "segmentation machine learning model" refers to a machine learning model trained or used to identify salient portions of text from unstructured text. In particular, the term "segmentation machine learning model" can include a machine learning model or a series of machine learning models working in conjunction that are used to identify salient portions of text from unstructured text. To illustrate, a segmentation machine learning model can include a document encoder capable of processing a plurality of languages (e.g., XLM-RoBERTa) and a machine learning model capable of labeling each word in a sequence (e.g., a sequence labeling machine learning model). The segmentation machine learning model can be any number of machine learning model types, such as a random forest model, a multilayer perceptron, a linear regression, a support vector machine, a deep tabular learning architecture, a deep learning Transformer (e.g., self-attention-based-tabular Transformer), or a logistic regression.

In other cases, a machine learning model comprises a sentiment identifying machine learning model. As used herein, the term "sentiment identifying machine learning model" refers to a machine learning model trained or used to generate various labels for unstructured text. In particular, the "term" sentiment identifying machine learning model refers to a machine learning model trained or used to generate a sentiment label, a topic, or an emotion label for unstructured text. The sentiment identifying machine learning model can be any number of machine learning model types, such as include a random forest model, a multilayer perceptron, a linear regression, a support vector machine, a deep tabular learning architecture, a deep learning Transformer (e.g., self-attention-based-tabular Transformer), or a logistic regression.

As used herein, the term "segment" refers to a portion of text from an instance of unstructured text. In particular, the term "segment" refers to a portion of text that contains a related thought, idea, or piece of information. To illustrate, a segment could include the intuitive boundaries around text that include related ideas or thoughts, such as portions of text that correlate to a related thought, idea, or piece of information associated with the user's experience with the system, product, service, or good for which the user is providing feedback.

As used herein, the term "salient" refers to portions of unstructured text that are noticeable or different from other portions of unstructured text. In particular, the term "salient" refers to a segment of text that contains a related thought, idea, experience, or piece of information that is noticeable or different from other thoughts, ideas, experiences, or pieces of information in other portions of the unstructured text. For instance, a salient portion of text in unstructured text can identify a specific piece of relevant information in unstructured text, such as the portion of unstructured text that relates to an experience (e.g., the service at a restaurant) or an aspect of the experience (e.g., food at the restaurant) associated with the system, product, service, event, or good for which the user is providing feedback.

As used herein, the term "sentiment" refers to the way a user feels about something with which they interact, such as a system, product, event, person, or process. In particular, the term "sentiment" refers to an attitude, thought, or judgment related to the thought, idea, experience, or piece of information in a given segment. To illustrate, a user may express a sentiment when giving feedback in unstructured text, including the experiences and feelings they had when interacting with the system, product, service, event, process, or good for which they are giving feedback. Additionally, a sentiment for a segment may be identified with a sentiment label. As used herein, the term "sentiment label" refers to a word or phrase that identifies or describes a sentiment expressed in a segment.

As used herein, the term "topic" refers to a subject of a segment. In particular, the term "topic" refers to a matter with which a segment of text deals with. To illustrate, a topic can include an area of the system, product, event, person or process with which the user dealt. For example, if a user was providing feedback about a restaurant, the topic of a segment could refer to service, menu items, or price.

As used herein, the term "emotion label" refers to a word or phrase that identifies an emotion associated with a segment. In particular, the term "emotion label" refers to the feelings a user may feel regarding an experience with the system, product, event, person, or process with which the user interacted and for which the user is providing feedback. For example, emotion labels can include joy, anger, trust, fear, sadness, disgust, surprise, or anticipation.

As used herein, the terms "digital survey" and "survey" refer to an electronic communication used to collect information. For example, the term survey can include an electronic communication in the form of a poll, questionnaire, census, or other type of sampling. To illustrate, a digital survey can include an electronic communication that includes one or more electronic survey questions based on information requested by an entity. Further, the term survey as used herein can generally refer to a method of requesting and collecting electronic data from respondents via an electronic communication distribution channel. As used herein, "digital text response," refers to a response to a survey question that is completed on an electronic device and stored digitally.

As used herein, the term "unclean text" refers to text that does not conform to traditional rules for forming words and sentences. In particular, the term "unclean text" refers to text that does not conform to strict spelling and grammar rules, contains incorrect or missing punctuation, and nonsensical text. For example, unclean text can be text that does not include capitalization or punctuation and contains misspelled words, sentence fragments, misplaced punctuation, or other nonsensical text.

Turning now to the figures, FIG. 1 illustrates a block diagram of a system environment 100 in which a segmentation classification system 104 operates in accordance with one or more embodiments. As illustrated in FIG. 1, the system environment 100 includes one or more server(s) 101, an administrator client device 112, respondent device(s) 106, and third-party feedback information service 116. As shown in FIG. 1, in some embodiments, the digital survey system 102 comprises the segmentation classification system 104. In other embodiments, the segmentation classification system 104 is a standalone system on the server(s) 101, without the digital survey system 102. Each of the administrator client device 112 and the respondent device(s) 106 are associated with a type of user. The administrator client device 112 may be associated with an administrator of the digital survey system 102 and/or the segmentation classification system 104 that uses the administrator client device 112 to manage the digital survey system 102 and/or the segmentation classification system 104. The respondent device(s) 106 may be associated with a respondent of a digital survey administered by the digital survey system 102 and/or a user that provides user feedback data via the respondent device(s) 106.

In some embodiments, the administrator client device 112, the respondent client device(s) 106, and the third-party feedback information service communicate with the server(s) 101 over a network 110. As described below, the server(s) 101 can enable the various functions, features, processes, methods, and systems described herein using, for example, the segmentation classification system 104 and/or the digital survey system 102. The segmentation classification system 104 and/or the digital survey system 102 comprise computer executable instructions that, when executed by a processor of the server(s) 101 perform certain actions described below with reference to FIGS. 2-10. Additionally, or alternatively, in some embodiments, the server(s) 101 coordinate with one or both of the administrator client device 112 to perform or provide the various functions, features, processes, methods, and systems described in more detail below. Although FIG. 1 illustrates a particular arrangement of the server(s) 101, the administrator client device 112, the respondent device(s) 106, and the third-party feedback information service 116, various additional arrangements are possible. For example, the server(s) 101 and the digital survey system 102 may directly communicate with the respondent device(s) 106, bypassing the network 110. As another example, the segmentation classification system 104 may be collocated on the server(s) 101, with or without the digital survey system 102.

Figure 11:
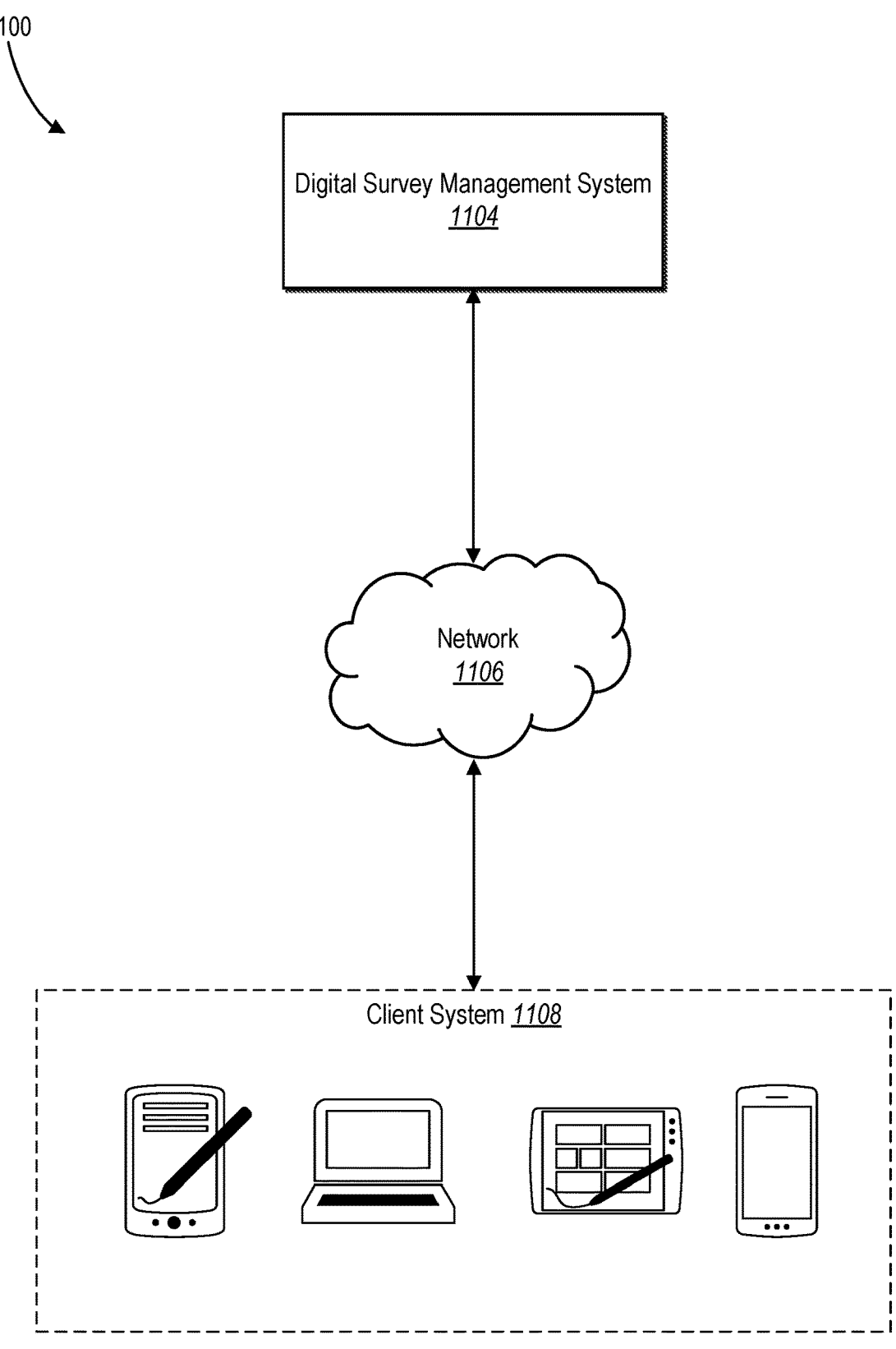
FIG. 11 illustrates a network environment of a digital survey system in accordance with one or more embodiments.

Generally, the administrator client device 112 and the respondent device(s) 106 may be one or any one or more of various types of client devices. For example, the administrator client device 112 and the respondent device(s) 106 may be mobile devices (e.g., a smart phone, a tablet), laptops, desktops, or any other type of computing devices, such as those described below with reference to FIG. 11. In some embodiments, the respondent device(s) 106 are telephones. Additionally, the server(s) 101 may include one or more computing devices, including those explained below with reference to FIG. 11. The server(s) 101 the administrator client device 112, the respondent device(s) 106, and the third-party feedback information service 116 may communicate using any communication platforms and technologies suitable for transporting data and/or communication signals, including the examples described below with reference to FIG. 11.

To provide user feedback data to the segmentation classification system 104 or the digital survey system 102, in certain embodiments, a respondent or other user interacts with a respondent application 108 on the respondent device(s) 106. In some embodiments, administrators or other users interact with an administrator client application 114 on administrator client device 112 to manage the digital survey system 102 and/or the segmentation classification system 104. In some embodiments, one or both of the respondent application 108 and the administrator client application 114 comprise web browsers, applets, or other software applications (e.g., native applications or web applications) available to the respondent client device 106 or the administrator client device 112, respectively. For example, in some embodiments, in response to an open-ended question provided by the digital survey system 102, a respondent uses the respondent application 108 to provide a digital free-form textual response to the open-ended question. The respondent device(s) 106 can then send the response provided by the respondent back to the segmentation classification system 104 and/or the digital survey system 102.

The digital survey system 102 and/or the segmentation classification system 104 can also communicate with the third-party feedback information service 116 to receive user feedback data. In some embodiments, the third-party media information service 116 can include systems and/or servers for a service that collects user feedback data from websites, applications, social media platforms, or other digital systems where users provide feedback data. To illustrate, the third-party feedback information service 116 can continuously monitor various websites, applications, or digital spaces where users provide opinions or feedback for mentions of services, products, events, or processes and gather user feedback data.

In some embodiments, though not illustrated in FIG. 1, the environment 100 has a different arrangement of components and/or has a different number or set of components altogether. For example, in certain embodiments, the respondent device(s) 106, administrator client device 112 and the third-party feedback information service 116 communicate directly with the server(s) 101, bypassing the network 110. As another example, in one or more embodiments, the environment 100 optionally includes a third-party server (e.g., that corresponds to the third-party feedback information service 116).

Figure 2:
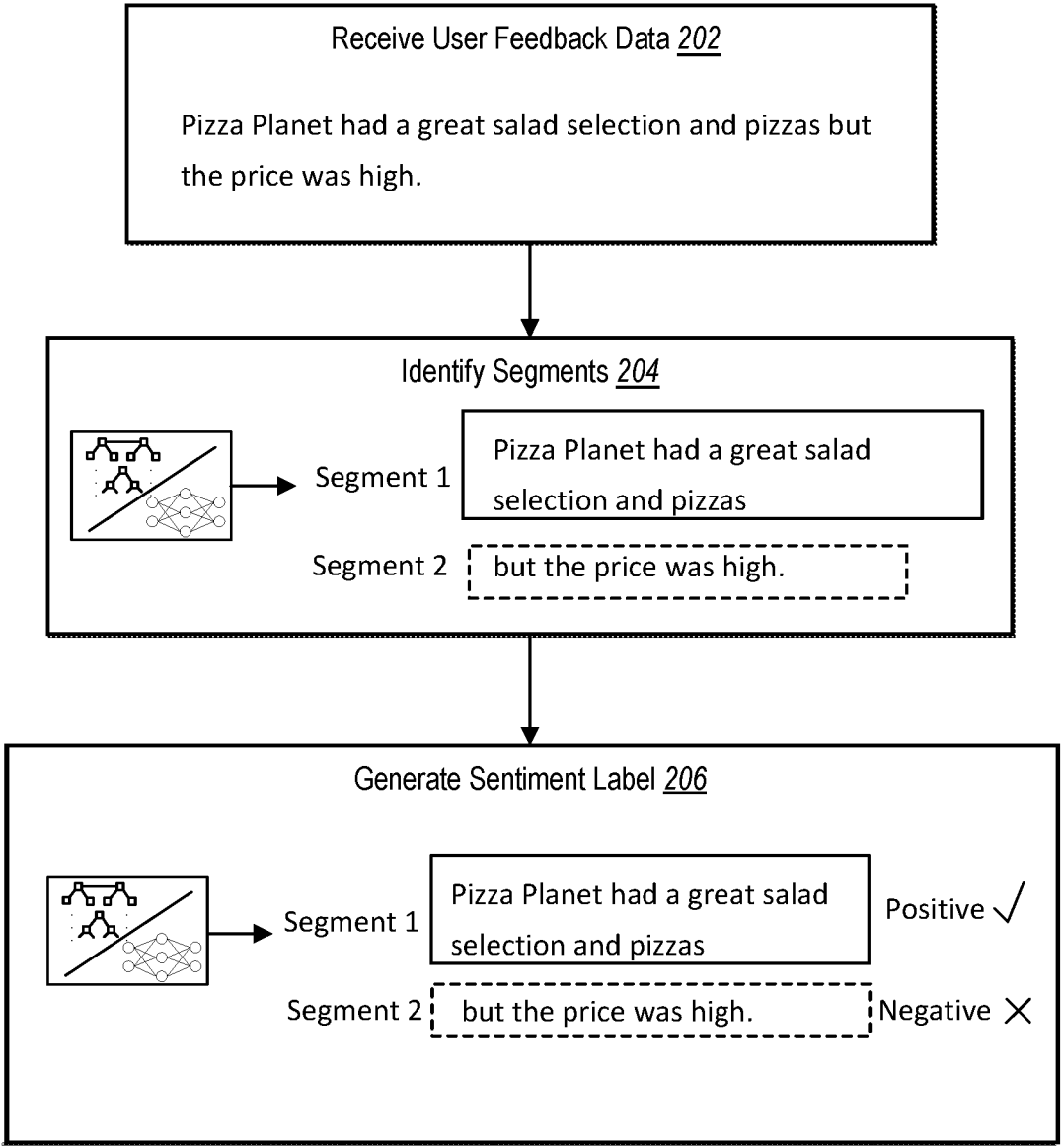
FIG. 2 illustrates a diagram of a segmentation classification system identifying segments and generating sentiment labels in accordance with one or more embodiments.

Turning now to FIG. 2, this figure illustrates a block diagram of the segmentation classification system 104 accurately identifying segments from unstructured text and generating a sentiment label for each segment. At an act 202 of FIG. 2, the segmentation classification system 104 receives user feedback data. In particular, the segmentation classification system 104 receives solicited or unsolicited user feedback data comprising unstructured text. For example, in some embodiments, the act 202 can comprise receiving solicited user feedback data by receiving responses to survey questions, such as digital text responses to digital survey questions. In other embodiments, the act 202 comprises receiving unsolicited user feedback data comprising unstructured text from a third-party feedback information service. As illustrated in act 202 of FIG. 2, the segmentation classification system 104 receives user feedback data comprising the unstructured text "Pizza Planet had a great salad selection and pizzas but the price was high."

At an act 204 of FIG. 2, the segmentation classification system 104 identifies segments from the unstructured text. In particular, the segmentation classification system 104 utilizes a segmentation machine learning model to identify segments comprising salient portions of text from the unstructured text. For example, the segmentation machine learning model is trained to identify segments of text from the unstructured text, where each segment comprises a salient portion of text representing related a thought, idea, or piece of information that the segmentation machine learning machine model identifies from the unstructured text. In some embodiments, the segmentation machine learning model can be a decision tree learning model. In other embodiments, the segmentation machine learning model can be a trained neural network.

As illustrated in act 204 of FIG. 2, the segmentation classification system 104 can identify multiple segments comprising salient portions of text from the unstructured text received in act 202 of FIG. 2. For example, as illustrated, the segmentation classification system 104 uses a segmentation machine learning model to identify "Pizza Planet had a great salad selection and pizzas" (Segment 1) denoting a salient portion of the unstructured text and "but the price was high" (Segment 2) denoting another salient portion of the unstructured text.

At an act 206 of FIG. 2, the segmentation classification system 104 generates a sentiment label for each segment. In particular, the segmentation classification system utilizes a sentiment identifying machine learning model trained to identify a sentiment label denoting an attitude, thought or judgement correlated with the information relayed in the given segment. In some embodiments, the sentiment identifying machine learning model can identify a sentiment label from one of very positive, positive, neutral, negative, or very negative. As illustrated in act 206, the segmentation classification system 104 utilizes a sentiment identifying machine learning model to generate the sentiment label "positive" for Segment 1 and the sentiment label "negative" for Segment 2.

Figure 3:
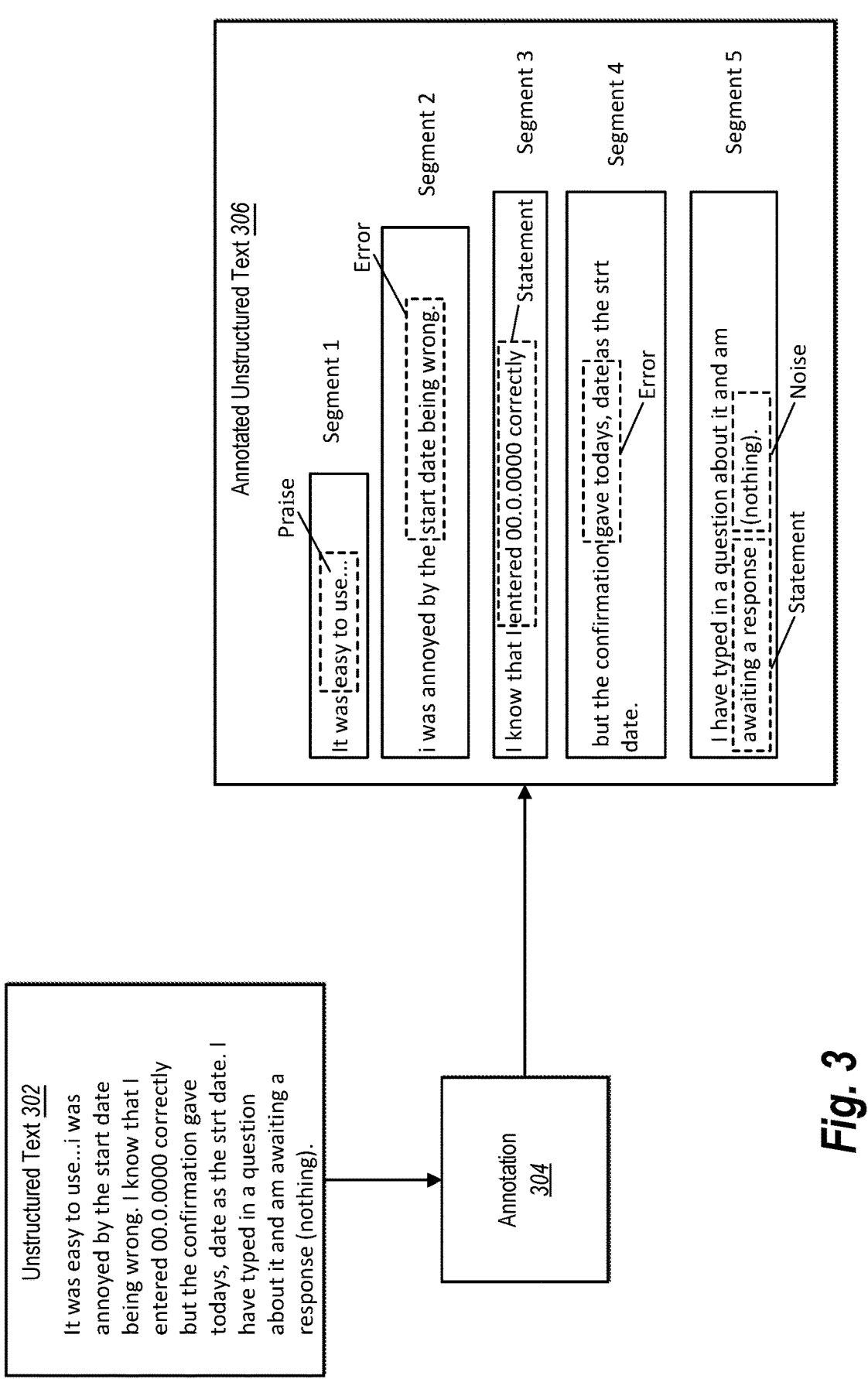
FIG. 3 illustrates a diagram of a segmentation classification system annotating unstructured text in accordance with one or more embodiments.

Turning now to FIG. 3, this figure illustrates a diagram for the segmentation classification system 104 generating annotated unstructured text. In particular, the segmentation classification system 104 annotates unstructured text denoting segments in unstructured text. In some embodiments, the segmentation classification system 104 utilizes the annotated unstructured text to train a segmentation machine learning model. Training a segmentation machine learning model is discussed further with respect to FIG. 4 below.

For example, the segmentation classification system 104 receives unstructured text 302. In particular, unstructured text 302 comprises unstructured text that provides feedback denoting a user experience with a system, product, service, event, or good. In some embodiments, unstructured text 302 comprises responses to surveys, such as digital text responses to digital surveys (e.g., in response to a survey question, entering text into a text box).

In some embodiments, user feedback data 302 comprises unstructured text that contains does not conform to traditional rules for forming words and sentences. For example, as illustrated, unstructured text 302 can comprise spelling errors (e.g., "strt"), misplaced punctuation (e.g., "todays, date") or other punctuation noise (" . . . "), grammar mistakes ("i"), or other mistakes, errors, or noise. As such, by utilizing annotated text with these mistakes, errors, and other noise and using it to train the segmentation machine learning model, the segmentation classification system 104 is able to accurately identify segments in unstructured text.

The segmentation classification system 104 then performs annotation 304. In some embodiments, the segmentation classification system 104 manually annotates the unstructured text in unstructured text 302 by using an annotation team (e.g., humans that annotate the text manually). In other embodiments, a machine learning model is trained to annotate unstructured text 302.

The segmentation classification system 104 performs annotation 304 by following a set of annotation rules to annotate unstructured text 302. Specifically, segmentation classification system 104 follows annotation rules for text that does not follow conventional spelling and grammar rules, and contains mistakes or errors. For example, for a given instance of unstructured text, the segmentation classification system 104 identifies where an instance of unstructured text should be segmented, labels the segment accordingly, labels one or more keywords, and links together the segment and the keyword(s). The segmentation classification system 104 follows this pattern over a plurality of instances of unstructured text to create a training dataset comprising annotated unstructured set used to train the segmentation machine learning model. Though only a single instance of unstructured text is illustrated in FIG. 3, it is understood that it is representative of many instances of unstructured text that segmentation classification system 104 annotates in order create a training dataset of annotated text.

As mentioned, in some embodiments, the segmentation classification system 104 first identifies where an instance of unstructured text 302 should be segmented. In particular, the segmentation classification system 104 can identify segments in unstructured text 302 according to the intuitive boundaries around text that result in segments of salient portions of text. For example, the segmentation classification system 104 segments unstructured text 302 if there is punctuation that shows the end of a sentence, such as a period, question mark, or exclamation point. In some embodiments, segmentation classification system 104 segments the instance of unstructured text if there is punctuation denoting the end of a sentence, even if the next sentence covers the same topic. As illustrated in annotated unstructured text 306, the segmentation classification system 104 notes the punctuation at the end of each sentence and identifies them as segments (e.g., Segment 1 and Segment 2), even though some sentences appear to cover the same topic.

Moreover, in some embodiments, the segmentation classification system 104 includes each character in the unstructured text in a single segment. Specifically, the segmentation classification system 104 does not include words or characters in multiple segments, nor does it exclude words or characters from a segment. For example, as illustrated in FIG. 3, every word and character from unstructured text 302 is included in a single segment in annotated unstructured text 306.

In some embodiments, the segmentation classification system 104 identifies segments an instance of unstructured text if there is a change in topic of conversation. In particular, the segmentation classification system 104 segments an instance of unstructured text if there is change of topic, even the segments appear in the same sentence. For example, the segmentation classification system 104 should label multiple segments in a sentence if there is a switch from general complaints/praise to specific complaints/praise, or vice versa. In another example, the segmentation classification system 104 identifies a change in topic if there is a change from specific past experiences to a general opinion. As illustrated in annotated unstructured text 306, in unstructured text 302 appears a sentence "It was easy to use . . . i was annoyed by the start date being wrong" and the segmentation classification system 104 denotes a change in topic and identifies separate segments "It was easy to use . . . " (Segment 1) and "i was annoyed by the start date being wrong." (Segment 2).

Moreover, in other embodiments, the segmentation classification system 104 identifies separate segments if a neutral phrase is attached to a positive or negative phrase, even if they share the same topic or are in the same sentence. In particular, if a factual statement is followed by a positive or negative phrase, the segmentation classification system 104 identifies separate segments. For example, as illustrated in annotated unstructured text 306, the segmentation classification system 104 identifies the sentence "I know that I entered 00.0.0000 correctly but the confirmation gave todays, date as the strt date." in unstructured text 302 has a neutral statement attached to a negative phrase. Hence, the segmentation classification system 104 and identifies two segments, "I know that I entered 00.0.0000 correctly" (Segment 3) and "but the confirmation gave todays, date as the strt date." (Segment 4).

In further embodiments, the segmentation classification system 104 identifies segments in an instance of unstructured text if one phrase negates or diminishes the meaning of another phrase, even if they share the same topic or are in the same sentence. In particular, if there is a positive and a negative phrase about the same topic in one sentence, the segmentation classification system 104 should segment the two phrases into separate segments. For example, if a single sentence or instance of unstructured text comprises a compliment and a complaint about customer service, the segmentation classification system 104 should identify two segments. To illustrate, for an instance of unstructured text that includes the sentence "I haven't used any services yet but so far the experience has been great" the segmentation classification system 104 should identify the two segments "I haven't used any services yet" and "but so far the experience has been great." Simply saying "the experience has been great" is positive but the fact that they "have not used any services yet" takes away meaning from the "great experience."

As mentioned above, in some embodiments, after identifying segments in an instance of unstructured text the segmentation classification system 104 identifies at least one keyword for each segment. As used herein, the term "keyword" refers to a word or grouping of words that summarize the topic of the segment or best describe what the user is trying to express in the segment. For example, a keyword can be a verb phrase or the subject of the topic (e.g., a person, place, thing, or idea). If the segment does not contain a noun or verb phrase that is descriptive, the segmentation classification system 104 can label adjectives as keywords. However, the segmentation classification system 104 should not label pronouns as a keywords.

As indicated, in certain embodiments, the segmentation classification system 104 can identify multiple keywords in a single segment and they need not be contiguous. To illustrate, for the segment "she was kind patient and confident" the segmentation classification system 104 could identify "kind," "patient," and "confident" as keywords. In contrast, the segmentation classification system 104 can identify a single term or phrase as a keyword for multiple segments. In particular, if multiple segments have the same topic but the best keyword is only mentioned in one segment, the segmentation classification system 104 can identify the single instance of the keyword as the keyword for all of the segments. To illustrate, for the segments "I loved the rep." and "She was the best." the segmentation classification system 104 could identify "rep" as an appropriate key word for both segments.

As mentioned, after identifying keywords, the segmentation classification system 104 selects a keyword label for each keyword. In particular, the segmentation classification system 104 selects a keyword label from a selection of keyword labels that describe the identified keyword. For example, the segmentation classification system 104 can select the keyword label "praise" when the identified keyword describes general or specific compliments. As illustrated in annotated unstructured text 306, the segmentation classification system 104 selects the keyword label "praise" for the keyword "easy to use" in Segment 1 as it describes a general compliment for the system, product, service, event, or good for which the user is providing feedback.

The segmentation classification system 104 can select the keyword label "error" when the identified keyword describes immediate technical issues or errors. For example, as illustrated in annotated unstructured text 306, the segmentation classification system 104 selects the keyword label "error" for the keyword "start date being wrong" in Segment 2 and the keyword "gave todays, dates" in Segment 4 as they describe immediate errors.

Additionally, the segmentation classification system 104 can select the keyword label "statement" when the identified keyword is a declarative or factual phrase that generally relates to the user experience. For example, as illustrated in annotated unstructured text 306, the segmentation classification system 104 selects the keyword label "statement" for the keyword "entered 00.0.0000 correctly" in Segment 3 and the keyword "awaiting a response" in Segment 5, as they are both declarative phrases that generally relate to experiences the user had with the system, product, service, event, or good for which the user is providing feedback.

In addition, the segmentation classification system 104 can select the keyword label "noise" when the identified keyword includes a factual statement that discusses an experience but is clearly unrelated to the topic of the unstructured text. In particular, the segmentation classification system 104 can select the keyword label "noise" if the keyword does not relate to the survey question the user is responding to or is not related to the experience for which the user is providing feedback. As illustrated in the annotated unstructured text 306, the segmentation classification system 104 selects the keyword label "noise" for the keyword "(nothing)." in Segment 5 as it is not related to the feedback the user is attempting to provide.

The segmentation classification system 104 can also select the keyword label "complaint" when the identified keyword describes general or specific negative comments about an experience. To illustrate, for a segment "you make it impossible to cancel plans" the segmentation classification system 104 can identify the keyword "cancel plans" and select the keyword label "complaint" because "cancel plans" describes a specific negative comment.

Moreover, the segmentation classification system 104 can select the keyword label "solution" when the identified keyword describes a resolution to a problem, whether the problem was a complaint or error. For example, for a segment "She helped me get a last-minute refill for my medication." the segmentation classification system 104 can identify the keyword "last-minute refill" and select the keyword label "solution" since the last-minute refill is a solution to a problem the user had during their experience.

Further, the segmentation classification system 104 can select the keyword label "suggestion" when the keyword describes a request for improvement, idea, or consideration. To illustrate, for a segment "Would like to see more support for sellers in the returns process." the segmentation classification system 104 can identify the keyword "support for sellers", and select the keyword label "suggestion" since "support for sellers" is a suggestion the user makes for the returns process.

The segmentation classification system 104 can also select the keyword label "gratitude" when the keyword shows appreciation. For example, for a segment "We appreciate all the frontline workers." the segmentation classification system 104 can identify the keyword "frontline workers" and select the keyword label "gratitude" since the keyword "frontline workers" summarizes the appreciation that is the topic of the segment.

In addition, the segmentation classification system 104 can select the keyword label "question" when the keyword describes an explicit question that shows anticipation for a response. For example, for a segment "Why can't I view payment history details online?" the segmentation classification system 104 can identify the keyword "view payment history details" and select the keyword label "question" as the keyword describes an explicit question that user expresses in the segment.

Lastly, the segmentation classification system 104 can select the keyword label "nothing/I don't know" when the keyword when "nothing" or "I'm not sure" is the main point of the message. In particular, the segmentation classification system 104 can select the keyword label "nothing/I don't know" if there is no feedback provided in the segment. To illustrate, if a segment comprises only "Not much." the segmentation classification system 104 can select the entire segment as they keyword (i.e., "Not much." is the keyword)

select the keyword label "nothing/I don't know" because there is no feedback in the segment. However, as another illustration, for a segment "Nothing—she was kind patient and confident" the segmentation classification system 104 should not select the keyword label "nothing/I don't know" because in this case "Nothing" refers to the idea that there is nothing to improve, which does not negate or diminish the compliment and is not a separate sentence.

As previously mentioned, after selecting a keyword label, the segmentation classification system 104 links the keyword(s) to the corresponding segment. For example, as illustrated in annotated unstructured text 306, each segment is linked the keywords phrases identified in each segment, such as "praise" with "It was easy to use . . . " for Segment 1, "error" with "i was annoyed by the start date being wrong." for Segment 2, "statement" with "I know that I entered 00.0.0000 correctly" for Segment 3, "error" with "but the confirmation gave todays, date as the strt date" for Segment 4, and "statement" and "noise" for "I have typed in a question about it and am awaiting a response (nothing.)" for Segment 5.

Figure 4:
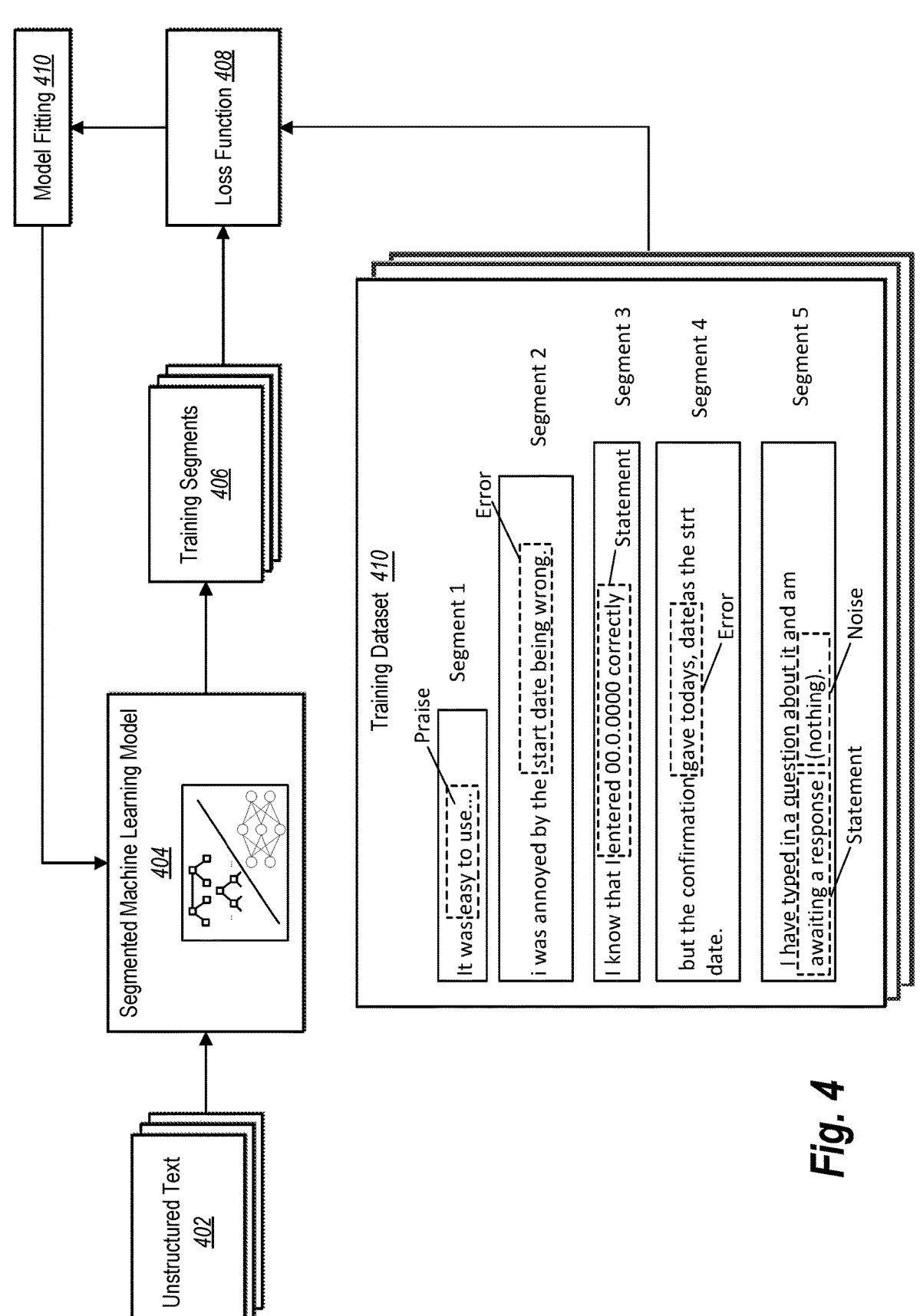
FIG. 4. illustrates a diagram of a segmentation classification system training a segmentation machine learning model in accordance with one or more embodiments.

Turning now to FIG. 4, this figure illustrates a diagram of training a segmentation machine learning model in accordance with one or more embodiments. In some embodiments, the segmentation classification system 104 uses a training dataset comprised of annotated unstructured text as described in FIG. 3 to train a segmentation machine learning model to accurately segment unstructured text, even when the unstructured text does not conform to traditional spelling and grammar rules.

As illustrated in FIG. 4, the segmentation classification system 104 accesses training dataset 410. In particular, training dataset 410 is comprised of annotated unstructured text (e.g., annotated unstructured text 306) indicating one or more starting points for segments of the unstructured text. Accordingly, in some embodiments, the segmentation classification system 104 treats the annotated unstructured text as a ground truth for training segmentation machine learning model 404.

As further illustrated in FIG. 4, the segmentation classification system 402 provides unstructured text 402 associated with the training dataset 410 to the segmentation machine learning model 404 to generate training segments based on the unstructured text 402. The unstructured text 402 represents unstructured text associated with training dataset 410 that is used for training the segmentation machine learning model 404. Accordingly, unstructured text 402 can constitute unstructured text wherein a user provides feedback about their experience with a system, product, service, or good. In some embodiments, the segmentation machine learning model identifies training segments 406, including indications of where a given segment begins and ends.

As also illustrated in FIG. 4, the segmentation classification system 104 utilizes a loss function 408 to compare the training segments 406 and the training dataset 410 (e.g., to determine an error or a measure of loss between them). For instance, in cases where the segmentation machine learning model 404 is an ensemble of gradient boosted trees, the segmentation classification system 104 utilizes a mean squared error loss function (e.g., for regression) and/or a logarithmic loss function (e.g., for classification) as the loss function 409.

By contrast, in embodiments where the segmentation machine learning model 404 is a neural network, the segmentation classification system 104 can utilize a cross-entropy loss function, an L1 loss function or a mean squared error loss function as the loss function 408. For example, the segmentation classification system 104 utilizes the loss function 408 to determine a difference between the training dataset 410 and the training segments 406.

Moreover, as illustrated in FIG. 4, the segmentation classification system 104 performs model fitting 410. In particular, the segmentation classification system 104 fits the segmentation machine learning model based on loss from the loss function 408. For instance, the segmentation classification system 104 performs modifications or adjustments to the segmentation machine learning model 404 to reduce the measure of loss from the loss function 408 for a subsequent training iteration.

For gradient boosted trees, for example, the segmentation classification system 104 trains the segmentation machine learning model 404 on the gradients of errors determined by the loss function 408. For instance, the segmentation classification system 104 solves a convex optimization problem (e.g., of infinite dimensions) while regularizing the objective to avoid overfitting. In certain implementations, the segmentation classification system 104 scales the gradients to emphasize corrections to under-represented classes (e.g., inaccurately identified segments).

In some embodiments, the segmentation classification system 104 add a new weak learner (e.g., a new boosted tree) to the segmentation machine learning model 404 for each successive training iteration as part of solving the optimization problem. For example, the segmentation classification system 104 finds a feature that minimizes a loss from the loss function 408 and either adds the feature to the current iteration's tree or starts to build a new tree with the feature.

In addition to, or in the alternative, gradient boosted trees, the segmentation classification system 104 trains a logistic regression to learn parameters for generating one or more segments, such as where to segment unstructured text. To avoid overfitting, the segmentation classification system 104 further regularizes based on hyperparameters such as the learning rate, stochastic gradient boosting, the number of trees, the tree-depth(s), complexity penalization, and L1/L2 regularization In embodiments where the segmentation machine learning model 404 is a neural network, the segmentation classification system 104 performs the model fitting 410 by modifying internal parameters (e.g., weights) of the segmentation machine learning model 404 to reduce the measure of loss for the loss function 408. Indeed, the segmentation classification system 104 modifies how segmentation machine learning model 404 analyzes and passes data between layers and neurons by modifying the internal network parameters. Thus, over multiple iterations, the segmentation classification system 104 improves the accuracy of the segmentation machine learning model 404.

Indeed, in some cases the segmentation classification system 104 repeats the training process illustrated in FIG. 4 for multiple iterations. For example, the segmentation classification system 104 repeats the iterative training by selecting new unstructured text along with a new training dataset comprised of annotated unstructured text. The segmentation classification system 104 further generates a new set of training segments for each iteration. As described above, the segmentation classification system 104 also compares a training segment at each iteration with the corresponding annotated unstructured text and further performs model fitting 410. The segmentation classification system 104 repeats this process until the segmentation machine learning model 404 generates training segments that result in segments that satisfy a threshold measure of loss.

Figure 5:
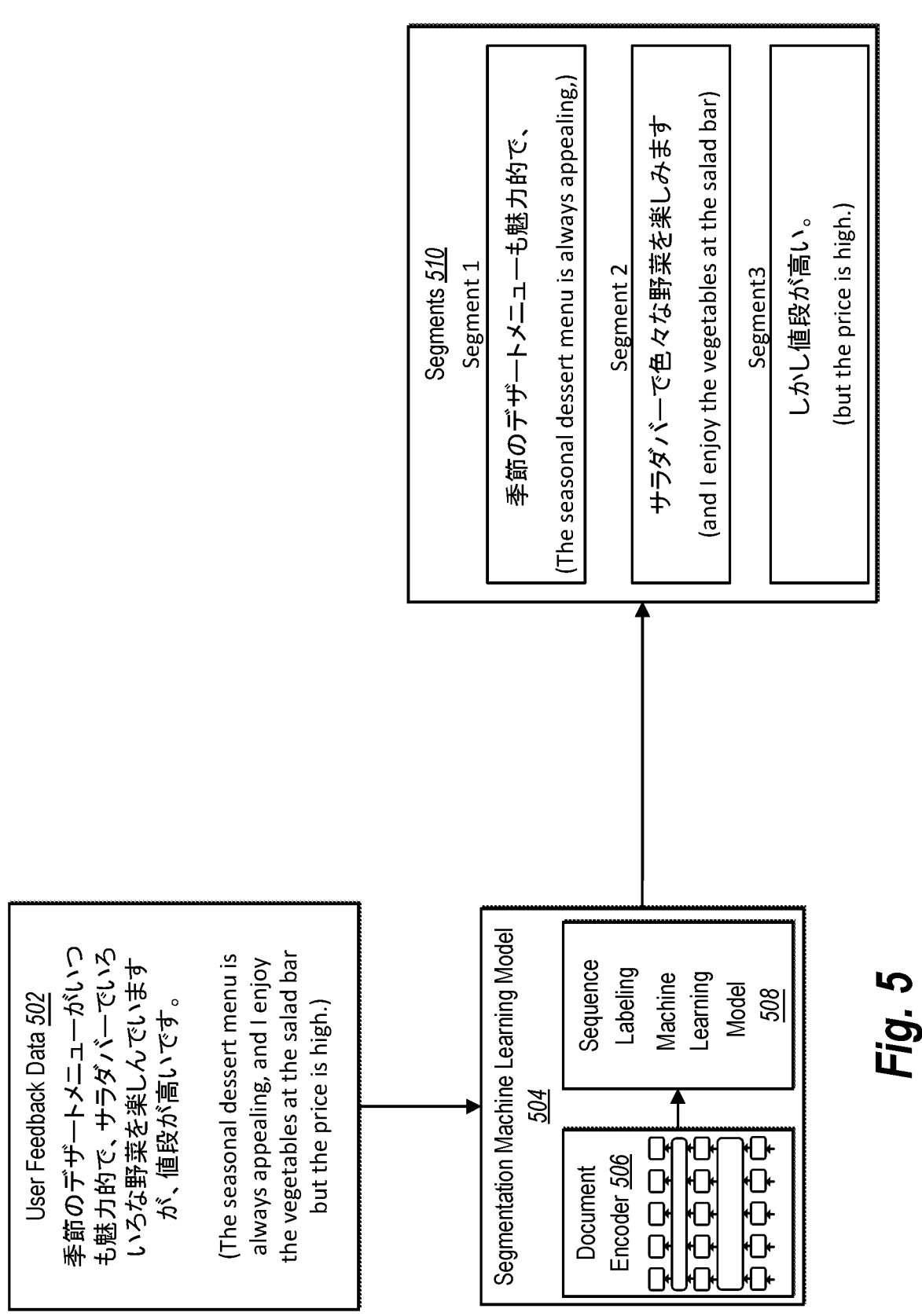
FIG. 5. illustrates a diagram of a segmentation classification system using a segmentation machine learning model to generate segments from unstructured text in accordance with one or more embodiments.

Turning now to FIG. 5, this figure illustrates the segmentation classification system 104 using the segmentation machine learning model to segment unstructured text into salient portions. As illustrated, the segmentation classification system 104 receives user feedback data 502. In particular, the segmentation classification system 104 can receive user feedback data 502 that comprises unstructured text that expresses user feedback about an experience with a system, product, service, or good. For example, in unstructured text a user may provide their thoughts, an opinion, a review, or critique about their experience with the system, product, service or good.

The segmentation classification system 104 can receive user feedback data 502 from multiple sources. In some embodiments, the segmentation classification system 104 receives user feedback data 502 by soliciting it directly through surveys. In particular, the segmentation classification system 104 can receive digital text responses to digital survey questions. For example, a user may receive an invitation to complete a survey that includes an option to respond to a question by entering unstructured text (e.g., in a text box).

In other embodiments, the segmentation classification system 104 receives user feedback 502 through a third-party feedback information service. In particular, the third-party feedback information service compiles user feedback comprising unstructured text from sources wherein a user may provide their qualitative assessment of their experience using a system, product, service, event, or good. In some embodiments, the third-party feedback information service utilizes social listening to identify what is being said about a system, product, service, or good on the internet or other digital space. In other embodiments, the third-party feedback information service uses software tools to gather unstructured text from websites, applications, social media platforms or other places on the internet where users may expressing their qualitative assessment of their experiences, such as in app reviews, blogs, discussion forums, and other social media outlets.

In addition to receiving user feedback data 502 from a variety of sources, in some embodiments, the segmentation classification system 104 receives user feedback data 502 comprising unstructured text in a multitude of languages that have varying characters and structures. For example, user feedback data 502 can comprise unstructured text from both consonantal-based languages (e.g., English) and character-based/logographic-based languages (e.g., Japanese). In another example, user feedback data can comprise unstructured text from languages with similar alphabet structures but different linguistic structures and pronunciations, such as romance languages (e.g., Spanish) and Germanic languages (e.g., English).

Moreover, user feedback data 502 can comprise unstructured text that is unclean. In particular, user feedback data 502 can comprise unstructured text that does not conform to spelling, grammar, and punctuation rules corresponding to the language in which the user wrote the unstructured text and contains various errors, mistakes, and noise. For example, user feedback data 502 often comprises data that is input quickly and without checking spelling, grammar, or punctuation. In another example, user feedback data 502 comprises text that a user inputs through a mobile device, resulting in a variety of typographical errors or mistakes. To illustrate, when a user inputs text on a mobile phone, autocorrect functions on the mobile device often change text to include words or characters the user did not intend to include.

As illustrated in FIG. 5, segmentation classification system 104 provides user feedback data 502 to a segmentation machine learning model 504 to generate segments 510. Segmentation machine learning model 504 can be a variety of machine learning models. For example, the segmentation machine learning model 504 can include one or more of a decision tree (e.g., a gradient boosted decision tree), a linear regression model, a logistic regression model, association rule learning, inductive logic programming, support vector learning, a Bayesian network, a regression-based model, principal component analysis, a clustering model, a neural network, or a combination thereof.

In other embodiments, segmentation machine learning model 504 comprises multiple machine learning models working in sequence. As illustrated in FIG. 5, segmentation machine learning model 504 can comprise a document encoder 506. In particular, segmentation machine learning model 504 can comprise document encoder 506 that is used to identify and process human language in unstructured text in user feedback data 502 and sequence labeling machine learning model 508 that uses the processed unstructured text from document encoder 506 as input and labels words to identify segments.

Document encoder 506 can include an encoder that processes human language so that the structure is understood and analyzed in context. In some embodiments, document encoder 506 uses natural language processing algorithms that can identify and process unstructured text from user feedback data 502. In particular, document encoder 506 utilizes a cross-lingual encoder that can process unstructured text across multitude of languages. For example, document encoder 502 can be a cross-lingual Transformer-based language model that can identify the language of the unstructured text (e.g., bi-directional encoder representation from Transformers (BERT) model). In certain embodiments, the encoder 502 is a XLM-RoBERTa model.

As mentioned, segmentation machine learning model 504 generates segments comprising of salient text portions of text from unstructured text. Segmentation machine learning model 504 can identify segments by utilizing tokenization, such as by using binary sequence tagging. In particular, segmentation machine learning model 504 can use binary sequence tagging in identifying segments by associating each word in the unstructured text in user feedback data 502 with a token.

Segmentation machine learning model 504 can also generate a token label for each token. In particular, segmentation machine learning model 504 generates a token label denoting a portions of a segment in which the given word associated with the token belongs. For example, segmentation machine learning model 504 can generate a first token label identifying the start of a given segment (e.g., the token is associated with a word that denotes the start of a segment). Moreover, the segmentation machine learning model 504 can generate a second token label identifying a portion of the segment other than the start of the segment (i.e., the token is associated with a word that does not begin the segment). For example, the segmentation machine learning model 504 can generate a token label of "1" if the token is associated with a word that starts a given segment and a token label of "0" if the token is associated with a word that is a portion of the segment other than the starting of the segment.

Figure 6:
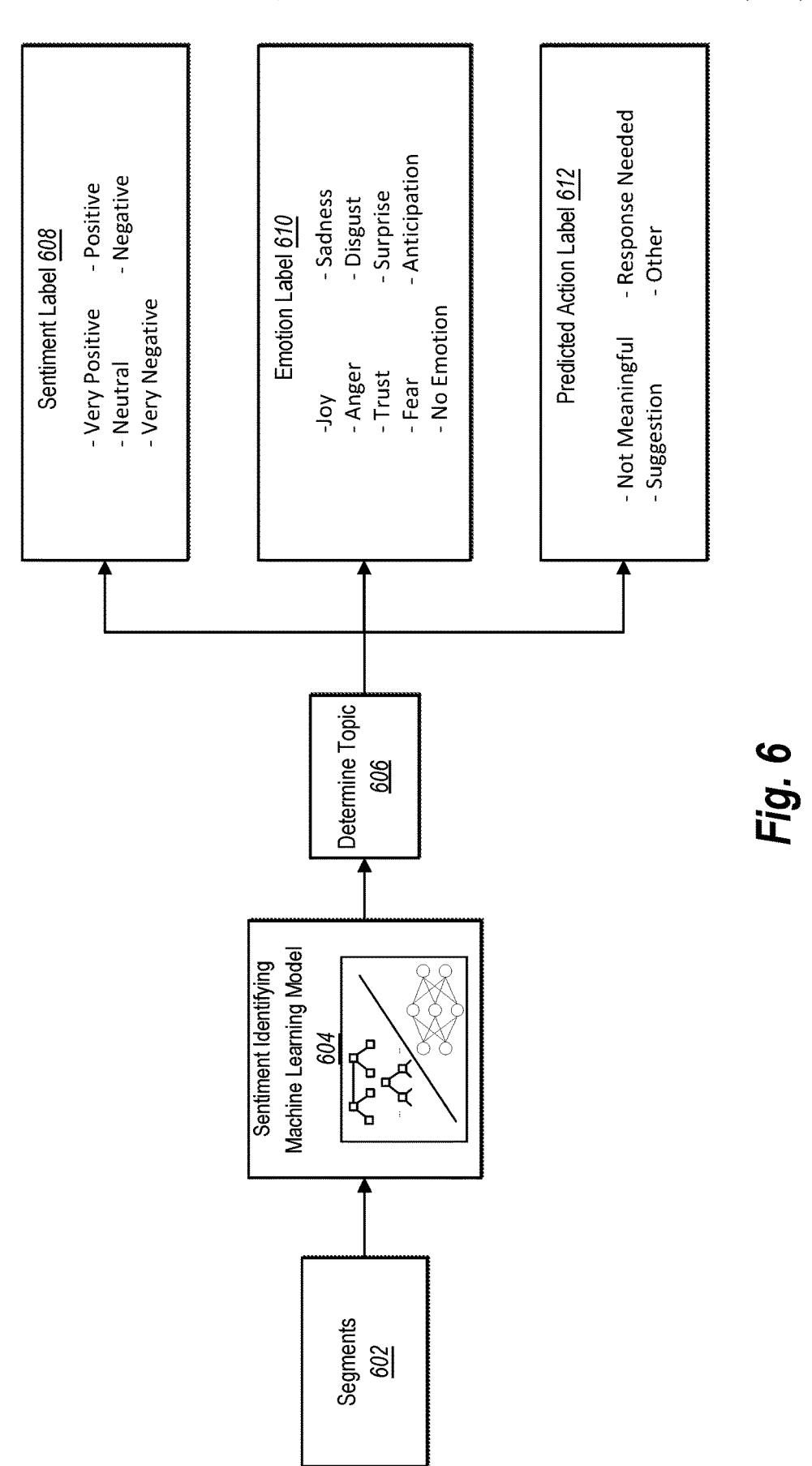
FIG. 6 illustrates a diagram of a segmentation classification system using a sentiment identifying machine learning model to determine a topic or generate labels in accordance with one or more embodiments.

Turning now to FIG. 6, this figure illustrates the segmentation classification system 104 using a sentiment identifying machine learning model to generate information for each segment. In some embodiments, sentiment identifying machine learning model 604 is a part of segmentation machine learning model 504 (e.g., additional algorithms of the machine learning model). In other embodiments, sentiment identifying machine learning model 604 is a separate machine learning model from segmentation machine learning model 504. Sentiment identifying machine learning model 604 can be a variety of machine learning models. For example, the segmentation machine learning model 504 can include one or more of a decision tree (e.g., a gradient boosted decision tree), a linear regression model, a logistic regression model, association rule learning, inductive logic programming, support vector learning, a Bayesian network, a regression-based model, principal component analysis, a clustering model, a neural network, or a combination thereof.

As illustrated, the sentiment identifying machine learning model 604 utilizes segments 602 as input. In embodiments where the sentiment identifying machine learning model 604 is separate from the segmentation machine learning model 504, the segmentation machine learning model 504 outputs segments and provides them to the sentiment identifying machine learning model 604 to generate additional information. In embodiments where the sentiment identifying machine learning model 604 is included as part of segmentation machine learning model 504, the segmentation machine learning model 504 outputs segments along with the additional information.

As illustrated in FIG. 6, the segmentation classification system 104 can determine topic 606. In particular, the segmentation classification system 604 can utilize sentiment identifying machine learning model 604 to determine a topic 606 for each segment of the segments 602. For example, the segmentation classification system 104 can determine a topic that denotes a subject of the segment. As another example, the segmentation classification system 104 can determine a topic for the segment that identifies a certain portion of the user experience about which the user is providing feedback (e.g., the service or a certain menu item at a restaurant).

In some embodiments, the segmentation classification system 104 determines a topic found in a plurality of segments by extracting topic from each segment. For example, in unstructured text providing feedback about a restaurant, the segmentation classification system 104 can determine that the topic of the segment is service or a menu item (e.g., pizza). To illustrate, for an instance of unstructured text "I visited Pizza Planet for the first time, great salad selection and pies. I also loved the number of draft beers, however there was no full bar." the segmentation classification system could identify topics of 'salad selection,' 'pizza pies,' 'draft beers,' and 'full bar.'

In other embodiments, the segmentation classification system 104 determines a topic by selecting a topic from a set of topics. In particular, the segmentation classification system 104 can utilize sentiment identifying machine learning model 604 to select a topic that represents the subject of the segment. For example, the segmentation classification system 104 can identify that a segment identified from unstructured text providing feedback about a restaurant discusses the service at the restaurant and select "service" as the topic from a plurality of topics. The segmentation classification system 104 can also suggest new topics to add to a set of topics. In particular, the segmentation classification system 104 can utilize sentiment identifying machine learning model 604 to identify phrases or words that are recurrent across a plurality of segments and suggest topics to add to the set of topics. For example, if sentiment identifying machine learning model 604 identifies that a multitude of segments mention the salad at a restaurant, sentiment identifying machine learning model 604 can suggest "salad" as a topic to add to the set of topics.

As illustrated in FIG. 6, the segmentation classification system 104 can generate a sentiment label 608 for each segment. In particular, the segmentation classification system 104 can utilize sentiment identifying machine learning model 604 to identify a sentiment label 608 that identifies an attitude, feeling, or judgment about the experience that a user expresses in a given segment. In some embodiments, the segmentation classification system 104 generates sentiment label 608 by selecting a sentiment label that describe the sentiment the user expresses in the segment from a set of sentiment labels. For example, the sentiment identifying machine learning model 604 can select from very positive, positive, neutral, negative, or very negative.

To illustrate, for the instance of unstructured text "I visited Pizza Planet for the first time, great salad selection and pies. I also loved the number of draft beers, however there was no full bar." the segmentation classification system 104 could identify the segments "I visited pizza planet for the first time" ("Segment A"), "great salad selection" ("Segment B"), "and pies" ("Segment C"), "I also loved the number of draft beers" ("Segment D") and "however there was no full bar" ("Segment E"). In this case, segmentation classification system 104 could identify the sentiment label neutral for Segment A, the sentiment label very positive for Segments B, C, and D, and the sentiment label negative for Segment E.

Moreover, in other embodiments, the segmentation classification system 104 can identify that a segment does not contain a sentiment. For example, the segmentation classification system 104 can identify that a segment contains a statement (e.g., recites factual information). As another example, a statement could give additional information (e.g., background information) that is not associated with a sentiment. In some embodiments, segmentation classification system 104 can generate a sentiment label "no sentiment" based on identifying that segment does not contain a sentiment. In other embodiments, the segmentation classification system 104 can determine to not generate a sentiment label based on identifying that there is no sentiment. To illustrate, for Segment A in the above example, the segmentation classification system 104 can identify that "I visited Pizza Planet for the first time" does not contain a sentiment and determine to not generate a sentiment label for the segment.

In addition to generating a sentiment label for each segment, the segmentation classification system 104 can generate a general sentiment label for an instance of unstructured text. In particular, when segmentation classification system 104 identifies multiple segments in an instance of unstructured text, segmentation classification system 104 can generate a general sentiment label for the instance of unstructured text as a whole in addition to generating a sentiment label for each segment. In some embodiments, the segmentation classification system 104 selects a general sentiment from a plurality of sentiments that best matches the sentiment in the instance of unstructured text. For example, the segmentation classification system 104 can select from very positive, positive, neutral, negative, very negative or mixed. To illustrate, for the instance of unstructured text "I visited Pizza Planet for the first time, great salad selection and pies. I also loved the number of draft beers, however there was no full bar." the segmentation classification system 104 could generate a general sentiment label of 'mixed' in addition to the sentiments for each segment described above.

The segmentation classification system 104 can also associate the topic for each segment with the sentiment label for each segment. For example, the segmentation classification system 104 can associate the topic and the sentiment label for each segment in a table, in a database, or other system. In some embodiments, the segmentation classification system 104 displays information relating to the associated topic and sentiment for each segment in a graphical user interface. Displaying information about associated topics and sentiments is discussed below with respect to FIGS. 7A and 7B.

As also illustrated in FIG. 6, the segmentation classification system 104 can also generate an emotion label 610 for each segment. In particular, the segmentation classification system 104 can generate an emotion label that denotes an emotion that represented in the text of the segment. In some embodiments, the segmentation classification system 104 generates a single emotion label for each segment. In other embodiments, the segmentation classification system 104 generates multiple emotion labels for each segment.

In some embodiments, the segmentation classification system 104 generates an emotion label by selecting an emotion label. In particular, the segmentation classification system 104 can select one or more emotion labels from a set of emotion labels that best represents the emotions represented in the segment. For example, the segmentation classification system 104 can select from a set of emotions that includes joy, anger, trust, fear, sadness, disgust, surprise, anticipation, or no emotion.

The segmentation classification system 104 can also associate the emotion label 610 with determined topic 606 or sentiment label 608, or both. For example, the segmentation classification system 104 can associate the topic and the sentiment label for each segment in a table, database, graphical user interface, or other representation.

The segmentation classification system 104 can also generate a predicted action label 612 for each segment. In particular, the segmentation classification system 104 can use sentiment identifying machine learning model 604 to generate predicted action label 612 by selecting one or more predicted action labels from a set of predicted action labels. For example, sentiment identifying machine learning model 604 can select from a set of predicted action labels by selecting from not meaningful, response needed, suggestion, or other.

Moreover, the segmentation classification system 104 can associate predicted action label 612 with one or more of determined topic 606, sentiment label 608, or emotion label 610. For example, the segmentation classification system 104 can associate the predicted action label 612 with one or more of determined topic 606, sentiment label 608, or emotion label 610 for a given segment in a table, database, graphical user interface, or other representation.

Segmentation classification system 104 can also perform actions associated with predicted action label 612. In particular, when the segmentation classification system 104 generates certain predicted action labels, the segmentation classification system 104 can perform actions associated with the generated precited action label. For, example, if the segmentation classification system 104 generates the predicted action label suggestion, the segmentation classification system 104 can perform one or more action associated with suggestion. In another example, if the segmentation classification system 104 generates the predicted action label response needed, the segmentation classification system 104 can perform one or more actions associated with response needed.

Moreover, the segmentation classification system 104 can perform actions based on a topic, sentiment label, or emotion label associated with the predicted action label. In particular, the segmentation classification system 104 can perform one or more actions based on associating certain sentiment labels, topics, or emotion labels with the predicted action label. For example, if segmentation classification system 104 generates a sentiment label very negative and predicted action label response needed, the segmentation classification system 104 can perform an action. In another example, if the segmentation classification system 104 determines the topic service and associates service with the sentiment label very negative and the emotion label anger, segmentation classification system 104 can perform a different action.

In some embodiments, segmentation classification system 104 can perform one or more actions based on generating a predicted action label suggestion. In particular, the segmentation classification system 104 can perform actions associated with suggestions given in the segment associated with the predicted action label suggestion. For example, the segmentation classification system 104 can store all segments associated with the suggestion prediction action label. To illustrate, the segmentation classification system 104 can store segments associated with the predicted action label suggestion in a searchable database used to organize and find suggestions identified in unstructured text. In another example, the segmentation classification system 104 can aggregate segments with the suggestion predicted action label according to topics associated with the suggestion predicted action label.

In other embodiments, segmentation classification system 104 can determine one or more actions to perform based on generating the predicted action label response needed. In particular, if the segmentation classification system 104 generates the predicted action label response needed, segmentation classification system 104 can determine one or more actions that respond to a user associated with the user feedback data from which the segmentation classification system 104 generated the segment. For example, the segmentation classification system 104 can send information to the user associated with the user feedback data. In another example, segmentation classification system 104 send a prompt to an agent associated with the digital survey system to contact the user associated with the user feedback.

In some embodiments, the segmentation classification system 104 determines one or more actions to perform based on the topic, sentiment label, or emotional label associated with the predicted action label response needed. In further embodiments, the segmentation classification system 104 determines actions to perform based on a combination of topics, sentiment labels or emotion labels with the predicted action label 'response needed.' For example, based on associating the predicted action label 'response needed' with the topic 'service,' the sentiment label 'very negative,' and the emotion label 'anger,' the segmentation classification system 104 can determine to one or more actions to perform.

As mentioned, based on generating the predicted action label response needed, segmentation classification system 104 can determine to send information to the person associated with user feedback data. In particular, segmentation classification system 104 can send information based on the topic, sentiment label, or emotion label associated with the predicted action label response needed. For example, segmentation classification system 104 can send educational materials about a topic associated with the predicted action label response needed to the person associated with user feedback data from which the segmentation classification system 104 identified the segment. As another example, based on generating the predicted action label response needed, a general sentiment label mixed, a sentiment label very positive associated with the topic pizza pies, and a sentiment label negative associated with the topic service, segmentation classification system 104 can send a coupon to the respondent associated with the user feedback data.

In some embodiments, segmentation classification system 104 can send information directly to a respondent device that submitted user feedback data. For example, if a respondent submits user feedback data from a device (e.g., by accessing a survey invitation through an application on the respondent device 106), segmentation classification system 104 can send information directly to the device that submitted the user feedback data (e.g., through respondent application 108). In other embodiments, segmentation classification system 104 sends information to contact information associated in with the user feedback data or unstructured text (e.g., contact information associated with a survey in which the respondent entered user feedback data).

Based on generating the predicted action label response needed, segmentation classification system 104 can also send a prompt to an agent to contact a respondent associated with user feedback data. In particular, segmentation classification system 104 can send a prompt for an agent to contact a respondent based on a topic, sentiment label, or emotion label associated with the predicted action label response needed, or certain combinations of topics, sentiment labels or emotion labels associated with the predicted action label response needed. For example, if segmentation classification system 104 associates the predicted action label response needed with the topic service and the sentiment label very negative, segmentation classification system 104 can send a prompt to an agent to contact the respondent associated with the user feedback data.

The segmentation classification system 104 can also determine different actions to perform based on certain combinations of topic, sentiment label, or emotion label with predicted action label response needed. In some embodiments, segmentation classification system 104 determines to perform a first action if there is a first combination of topic, sentiment label, and emotion label associated with the predicted action label response needed and to perform a second action if there is a second combination of topic, sentiment label, and emotion label associated with the predicted action label response needed. To illustrate, if the segmentation classification system 104 associates the predicted action label response needed with a topic food, a sentiment label negative, and a emotion label disgust, the segmentation classification system 104 can determine to send information to a user associated with the user feedback data. However, if segmentation classification system 104 associates the predicted action label response needed with the topic service, the sentiment label very negative and the emotion label anger, segmentation classification system 104 can determine to send a prompt to an agent to contact the respondent associated with the user feedback data.

In other embodiments, the segmentation classification system 104 can determine actions to perform based on a response score. In particular, segmentation classification system 104 can generate a response score and determine different actions to perform based on the response score. For example, segmentation classification system 104 can generate a response score based on a determined topic and a generated sentiment label and emotion label. Moreover, the segmentation classification system 104 can determine actions based on the response score meeting a response threshold. In particular, segmentation classification system 104 can determine to perform first action based on the response score meeting a first response threshold and to perform a second action based on the response score meeting a second response threshold. For example, segmentation classification system 104 can determine to send information to the person associated with user feedback data based on the response score meeting a first response threshold and determine to send a prompt to an agent to contact the person associated with the user feedback data based on the response score meeting a second response threshold.

Figure 7A:
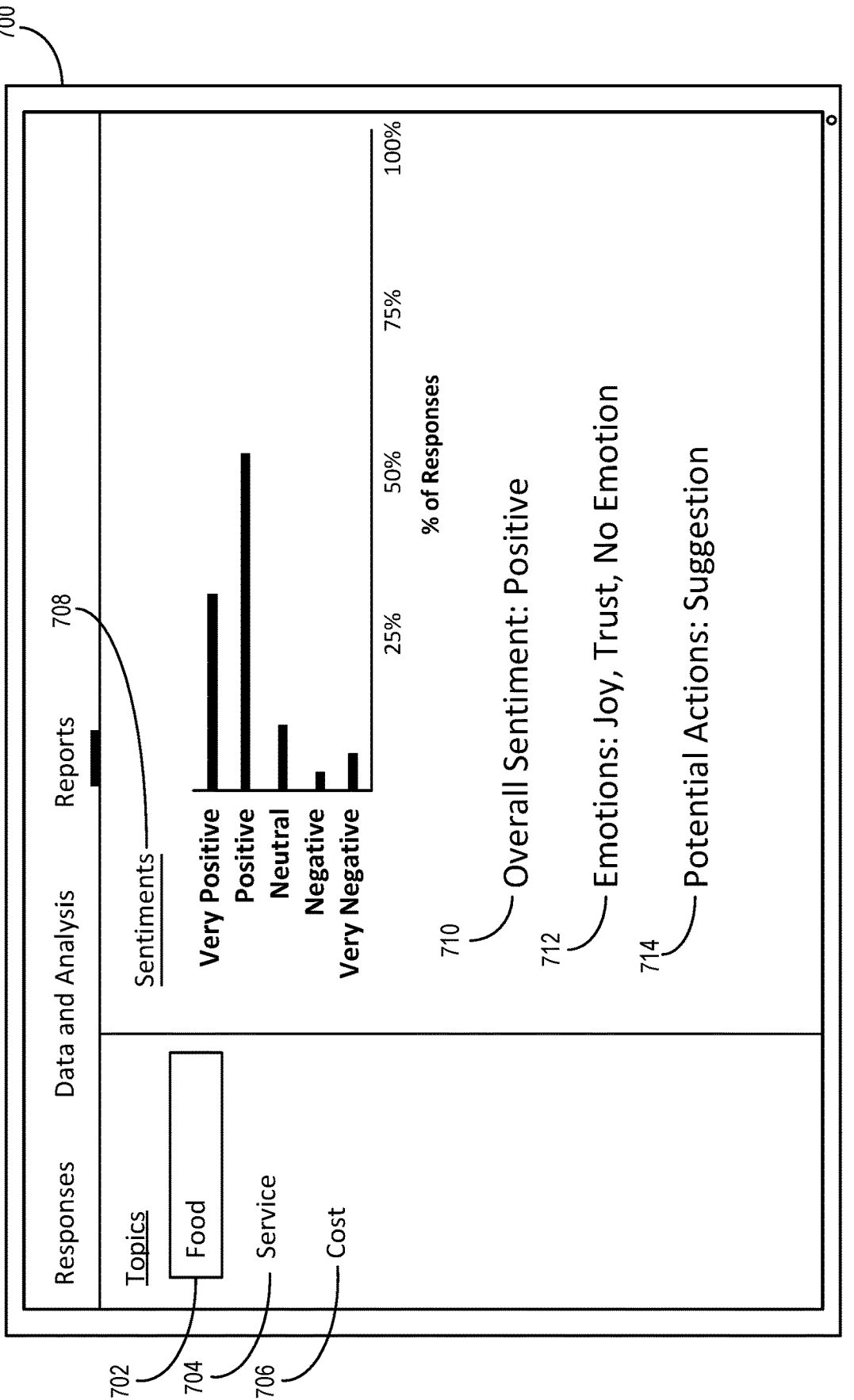
FIGS. 7A-7B illustrate presenting a graphical user interfaces displaying information about segments in accordance with one or more embodiments.
Figure 7B:
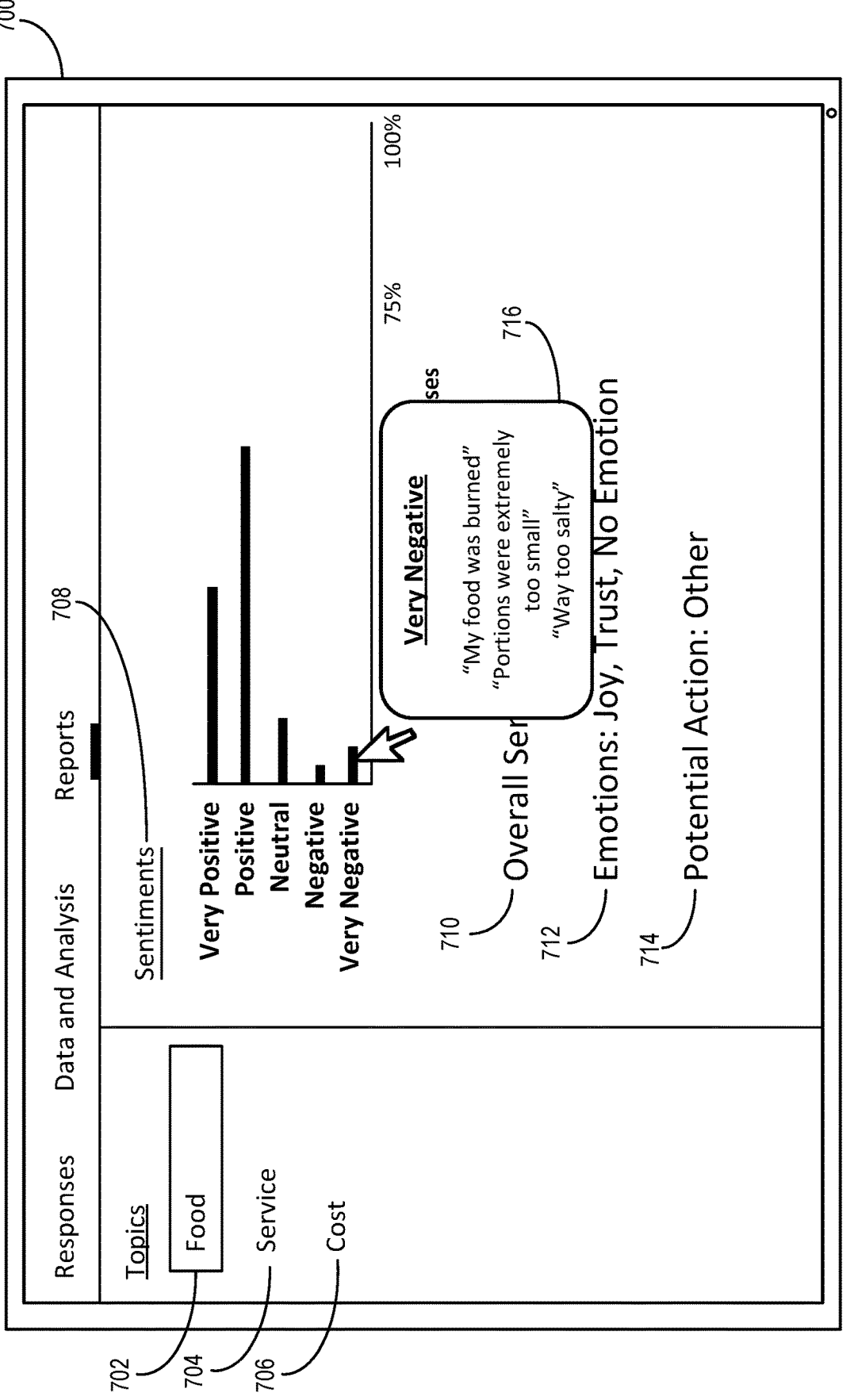

Turning now to FIGS. 7A and 7B, these figures illustrate graphical user interfaces displaying information about segments in accordance with one or more embodiments. FIG. 7A illustrates a graphical user interface that segmentation classification system 104 can provide that displays information about segments and associated sentiment labels, emotional labels, and predicted action labels. FIG. 7B illustrates graphical user interface displaying additional information about segments in response to a selection in the graphical user interface.

As illustrated in FIG. 7A, the segmentation classification system 104 presents information related to segments for display in graphical user interface 700. In some embodiments, the segmentation classification system 104 displays information from segments identified from a plurality of instances of user feedback data. In particular, segmentation classification system 104 can display information about segments from user feedback received from the same source. For example, in certain embodiments, segmentation classification system 104 displays information about segments identified from user feedback data that comprises survey responses from the same survey, such as digital text responses from the same digital surveys. In other embodiments, segmentation classification system 104 displays information about segments identified from user feedback data received from a third-party media information service that relates to a certain system, product, service, or good.

In some embodiments, the segmentation classification system 104 displays information about segments in a graphical user interface according to topic. Specifically, the segmentation classification system 104 can aggregate information about sentiment labels, emotion labels, and predicted action labels associated with a topic and display the information in the graphical user interface according to the topic. For example, as illustrated, the graphical user interface 700 includes topic 702, topic 704, and topic 706 that each correspond to a topic determined by the segmentation classification system 104. In certain embodiments, topic 702, topic 704, and topic 706 include selectable options that, when selected, display information relating to the corresponding topic in a window of graphical user interface 700.

As illustrated, the segmentation classification system 104 can display information about sentiment labels associated with a topic. For example, FIG. 7A illustrates sentiments 700 that displays a representation of sentiment labels associated with topic 702. Though illustrated as a graph, it is understood that sentiments 708 can be displayed in in other visual display methods, such as a table, a pie chart, or a list. In addition to sentiments 708, graphical user interface 700 includes overall sentiment 710 that corresponds to a sentiment for the topic as a whole. For example, overall sentiment 710 is an average sentiment of the sentiment labels for individual segments.

As also illustrated, the segmentation classification system 104 can present information for display about emotion labels associated with a topic. For example, FIG. 7A illustrates emotions 712 that correspond to emotion label associated with a topic. In some embodiments, the segmentation classification system 104 can present all the emotion labels associated with a topic. In other embodiments, the segmentation classification system 104 displays only a certain number of emotions associated with the topic.

As further illustrated, the segmentation classification system 104 can present information about predicted action labels associated with a topic. Specifically, graphical user interface 700 can include potential actions 714 denoting information about actions determined or performed by the segmentation classification system 104 based on a predicted action label. For example, potential actions 714 can include actions determined by the segmentation classification system 104 based on a topic and associated sentiment label, emotion label, or predicted action label. In another example, potential actions 714 can include actions performed by the segmentation classification system 104 based on a topic and associated sentiment label, emotion label, or predicted action label.

In other embodiments, potential actions 714 includes a selectable option that, when selected, displays additional information about actions determined or performed by the segmentation classification system 104. For example, upon detecting a selection of the selectable option 714, the segmentation classification system 104 can open a new window in graphical user interface 700 to present information about actions determined or performed by the segmentation classification system 104.

FIG. 7B illustrates an example embodiment of segmentation classification system 104 presenting information about segments associated with a topic for display in a graphical user interface. Specifically, in some embodiments, the segmentation classification system 104 can present, for display in a graphical user interface, the text of segments that are associated with a certain topic, sentiment label, emotion label, or predicted action label. For example, by selecting a selectable option in the graphical user interface, the segmentation classification system 104 presents a list including the text of each segment associated with the topic, sentiment label, emotion label, or predicted action label. As illustrated, upon selection of a sentiment of sentiments 708, the segmentation classification system 104 presents a list of the segments associated with the sentiment label very negative for display in a pop-up window of graphical user interface 700. Though presented as a pop-up window, it is understood that the list of segments can be presented in graphical user interface 700 in a variety of ways, such as by opening a new window in graphical user interface 700, or presenting a link to a database of segments.

Turning now to FIG. 8, this figure illustrates a diagram of performance increases of the segmentation classification system 104 over conventional systems. As illustrated, by comparing F1 scores the segmentation classification system 104 demonstrates increases in performance over conventional systems across a variety of languages.

For example, as illustrated, in English the segmentation classification system 104 shows an overall percentage difference increase of 9.74% in F1 scores. However, for neutral and mixed responses, the segmentation classification system 104 shows an even greater increase over conventional system. As illustrated, for neutral responses that segmentation classification system 104 shows an increase of 30.00% in F1 scores and for mixed responses the segmentation classification system 104 shows an increase of 14.00%. The segmentation classification system 104 also shows an increase in Spanish, with an overall percentage increase in F1 scores of 8.49%, an increase of 16.13% in F1 scores for neutral responses, and an increase of 25.00% in F1 scores for mixed responses.

Moreover, the segmentation classification system 104 vastly improves performance over conventional systems for Japanese. As previously mentioned, conventional systems rely on grammar and punctuation rules for consonantal-based languages, such as English, and fail to identify segmentation boundaries in token-based or logographic-based languages, such as Japanese. However, as illustrated in FIG. 8, the segmentation classification system 104 vastly improves performance in overall percentage increase of 41.01% in F1 scores, along with an increase of 56.10% in F1 scores for neutral responses and an increase of 44.45% for mixed responses.

Figure 9:
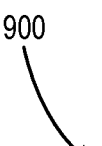
FIG. 9 illustrates a flowchart of a series of acts for segmenting unstructured text in accordance with one or more embodiments.
Figure 9:
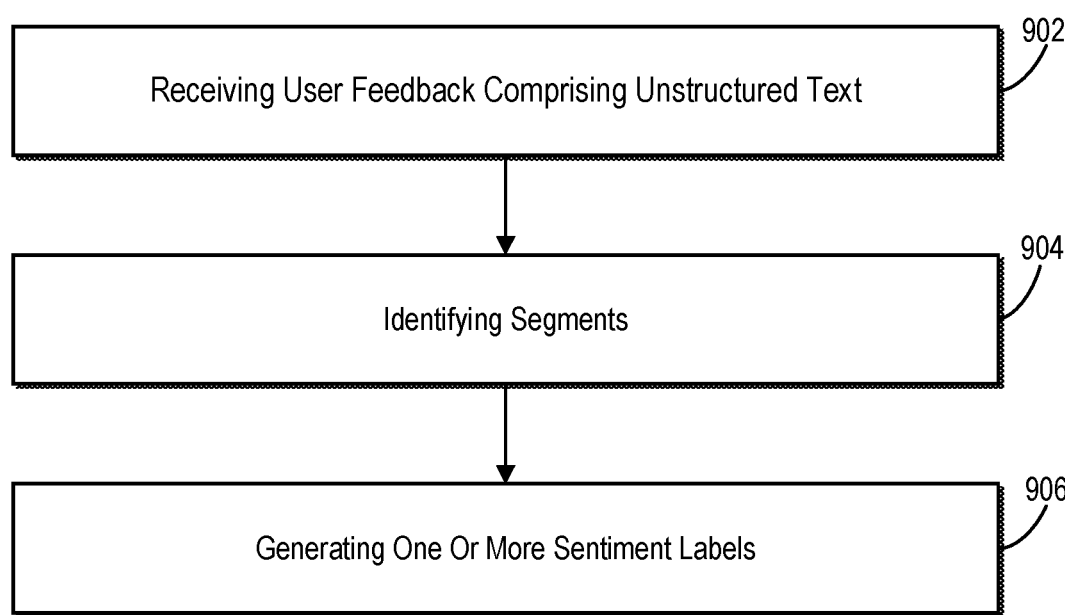

FIGS. 1-8, the corresponding text, and the examples provide a number of different methods, systems, devices, and non-transitory computer-readable media of the segmentation classification system 104. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for identifying segments of salient portions of text from unstructured text and generating sentiment labels for each segment in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 of receiving user feedback comprising unstructured text, an act 904 of identifying segments, and an act 906 of generating a sentiment label for each segment.

In particular, the act 902 can include receiving user feedback comprising unstructured text, the act 904 can include identifying, using a segmentation machine learning model, a plurality of segments from the unstructured text, wherein a given segment of the plurality of segments comprises a salient portion of the unstructured text, and the act 906 can include generating, using a sentiment identifying machine learning model, a sentiment label for each segment of the plurality of segments.

For example, in one or more embodiments, the series of acts 900 includes wherein the user feedback data comprises digital text responses to digital survey questions. In addition, in one or more embodiments, the series of acts 900 includes wherein identifying, using the segmentation machine learning model, segments further comprises: associating tokens for each word in the unstructured text and generating a token label for each token. Moreover, in one or more embodiments, the series of acts 900 includes generating the token label for each token comprises: generating a first token label identifying a start of a given segment of the plurality of segments and generating a second token label identifying a portion of the given segment other than the start of the given segment.

Further, in one or more embodiments, the series of acts 900 includes determining a topic for each segment of the plurality of segments and associating the topic for each segment with the sentiment label for each segment. Also, in one or more embodiments, the series of acts 900 includes generating, using the sentiment identifying machine learning model, an emotion label for each segment of the plurality of segments and associating the emotion label for each segment with the topic and the sentiment label.

In addition, in one or more embodiments, the series of acts 900 includes generating a predicted action label for a given segment based on the topic and the sentiment label associated with a given segment and performing the predicted action. Also, in one or more embodiments, the series of acts 900 includes wherein the segmentation machine learning model comprises a document encoder capable of processing a plurality of languages and a sequence labeling machine learning model. Moreover, in one or more embodiments, the series of acts 900 includes wherein generating the sentiment label comprises one of very positive, positive, neutral, negative, or very negative.

Also, in one or more embodiments, the series of acts 900 includes accessing a training dataset comprising annotated unstructured text, the annotated unstructured text indicating one or more starting points for a corresponding one or more salient portions within the unstructured text; training the segmentation machine learning model based on the annotated unstructured text; providing an instance of unstructured text to the trained segmentation machine learning model; and receiving, from the trained segmentation machine learning model, segments from the instance of unstructured text, wherein each segment comprises salient portions of the unstructured text.

Moreover, in one or more embodiments, the series of acts 900 includes wherein the annotated unstructured text comprises text from a plurality of languages. Further, in one or more embodiments, the series of acts 900 includes wherein the annotated unstructured text comprise unclean text.

Additionally, in one or more embodiments, the series of acts 900 includes determining a topic for each segment of the plurality of segments; associating the topic for each segment with the sentiment label for each segment; generating a predicted action for a given segment based on the topic and the sentiment label associated with the given segment; and performing the predicted action. Also, in one or more embodiments, the series of acts 900 includes identifying segments by associating tokens for each word in the unstructured text; generating a first token label identifying a start of a given segment of the plurality of segments; and generating a second token label identifying a portion of the given segment other than the start of the given segment.

Further, in one or more embodiments, the series of acts 900 includes determining a topic for each segment of the plurality of segments; generating an emotion label for each segment of the plurality of segments; and associating the topic and the emotion label for each segment with the sentiment label for each segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
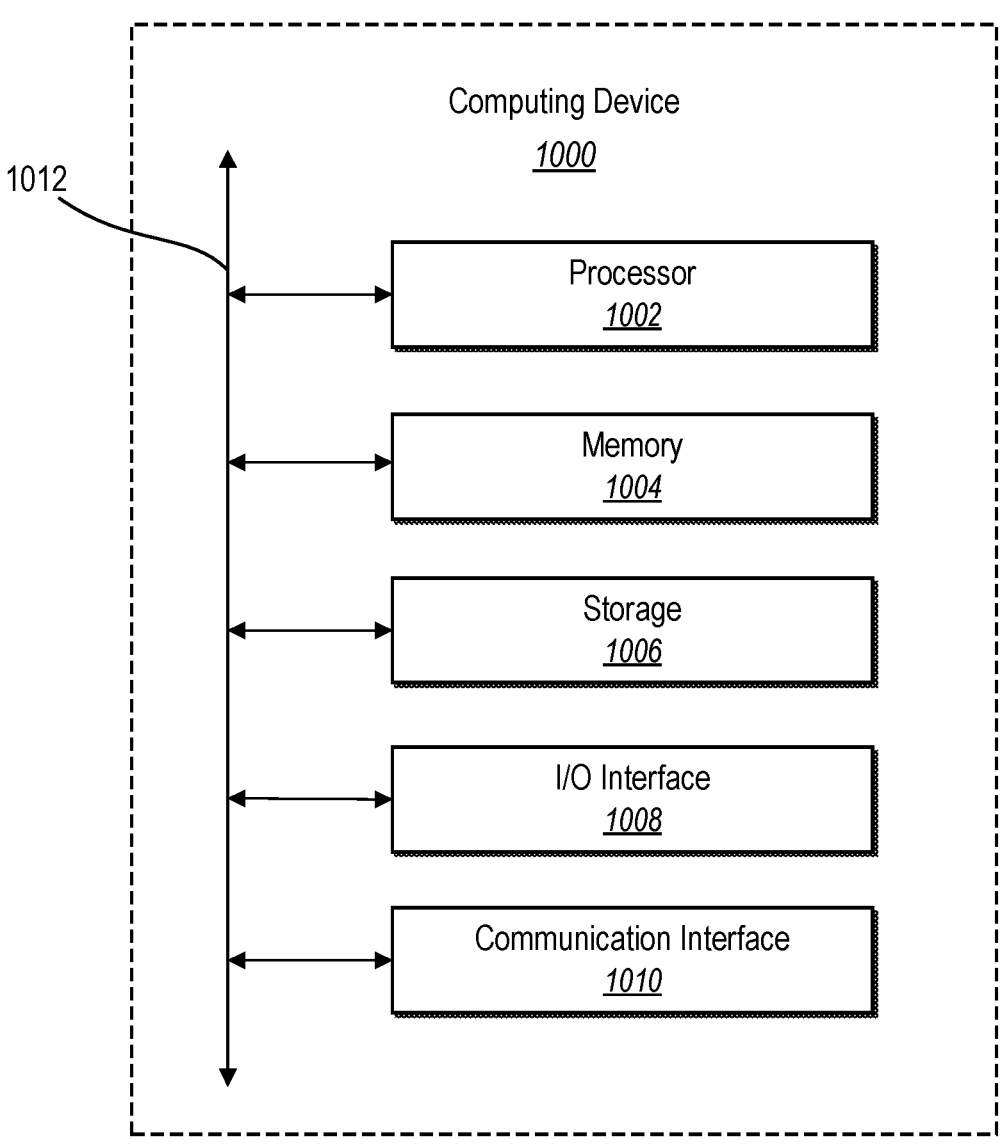
FIG. 10 illustrates a block diagram of an example computing device for implementing one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., server(s) 101, administrator client device 112, respondent device(s) 106, and third-party feedback information service 116). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving user feedback data comprising unstructured text;
   training, using unclean text, a segmentation machine learning model to generate segments of salient text in a plurality of languages;
   identifying, using the segmentation machine learning model, a plurality of segments from the unstructured text, wherein a given segment of the plurality of segments comprises a salient portion of the unstructured text;
   generating, using a sentiment identifying machine learning model, a sentiment label, and an emotion label for each segment of the plurality of segments;
   generating a predicted action label for a given segment based on the sentiment label and the emotion label associated with the given segment; and
   generating, based on a combination of the sentiment label and the emotion label associated with the predicted action label, a response for a respondent associated with the user feedback data.

2. The computer-implemented method of claim 1, wherein the user feedback data comprises digital text responses to digital survey questions.

3. The computer-implemented method of claim 1, wherein identifying, using the segmentation machine learning model, segments further comprises:
   associating tokens for each word in the unstructured text; and
   generating a token label for each token.

4. The computer-implemented method of claim 3, wherein generating the token label for each token comprises:
   generating a first token label identifying a start of a given segment of the plurality of segments; and generating a second token label identifying a portion of the given segment other than the start of the given segment.

5. The computer-implemented method of claim 1, further comprising:

determining a topic for each segment of the plurality of segments; and associating the topic for each segment with the sentiment label for each segment.

6. The computer-implemented method of claim 5, further comprising:

generating, using the sentiment identifying machine learning model, the emotion label for each segment of the plurality of segments by selecting the emotion label from a set of emotion labels comprising joy anger, trust, fear, sadness, disgust, surprise, anticipation, and no emotion; and associating the emotion label for each segment with the topic and the sentiment label.

7. The computer-implemented method of claim 5, further comprising generating the predicted action label for the given segment based on a combination of the topic, the emotion label and the sentiment label associated with the given segment.

8. The computer-implemented method of claim 1, wherein the segmentation machine learning model comprises:

a document encoder capable of processing a plurality of languages; and a sequence labeling machine learning model.

9. The computer-implemented method of claim 1, wherein generating the sentiment label comprises one of: very positive, positive, neutral, negative, or very negative.

10. A non-transitory computer-readable medium storing instructions that, when executed by at least one processor, cause a computer system to:

receive user feedback data comprising unstructured text;

train, using unclean text, a segmentation machine learning model to generate segments of salient text in a plurality of languages;

identify, using the segmentation machine learning model, a plurality of segments from the unstructured text, wherein a given segment of the plurality of segments comprises a salient portion of the unstructured text;

generate, using a sentiment identifying machine learning model, a sentiment label and an emotion label for each segment of the plurality of segments;

generate a predicted action label for a given segment based on the sentiment label and the emotion label associated with the given segment; and generate, based on a combination of the sentiment label and the emotion label associated with the predicted action label, a response for a respondent associated with the user feedback data.

11. The non-transitory computer-readable medium of claim 10, further comprising instruction that, when executed by the at least one processor, cause the computer system to train the segmentation machine learning model by:

accessing a training dataset comprising annotated unclean unstructured text, the annotated unclean unstructured text indicating one or more starting points for a corresponding one or more salient portions within unclean unstructured text;

modifying parameters of the segmentation machine learning model based on the annotated unclean unstructured text;

providing an instance of unstructured text to the segmentation machine learning model; and receiving, from the segmentation machine learning model, segments from the instance of unstructured text, wherein each segment comprises salient portions of the unstructured text.

12. The non-transitory computer-readable medium of claim 11, wherein the annotated unclean unstructured text comprises text from a plurality of languages.

13. The non-transitory computer-readable medium of claim 11, wherein the annotated unclean unstructured text comprises unstructured text comprising misspelled words, sentence fragments, misplaced punctuation, or nonsensical text.

14. The non-transitory computer-readable medium of claim 10, further comprising instructions that, when executed by the at least one processor, cause the computer system to:

determine a topic for each segment of the plurality of segments;

associating the topic for each segment with the sentiment label for each segment; and generating the predicted action label for the given segment based on the topic, the emotion label, and the sentiment label associated with the given segment.

15. The non-transitory computer-readable medium of claim 10, wherein generating the sentiment label comprises selecting, using the sentiment identifying machine learning model, one of very positive, positive, neutral, negative, or very negative.

16. A system comprising:

at least one processor; and at least one non-transitory computer-readable storage medium storing instructions that, when executed by the at least one processor, cause the system to:

receive user feedback data comprising unstructured text;

train, using unclean text, a segmentation machine learning model to generate segments of salient text in a plurality of languages;

identify, using the segmentation machine learning model, a plurality of segments from the unstructured text, wherein a given segment of the plurality of segments comprises a salient portion of the unstructured text;

generate, using a sentiment identifying machine learning model, a sentiment label and an emotion label for each segment of the plurality of segments;

generate a predicted action label for a given segment based on the sentiment label and the emotion label associated with the given segment; and generate, based on a combination of the sentiment label and the emotion label associated with the predicted action label, a response for a respondent associated with the user feedback data.

17. The system of claim 16, wherein the user feedback data comprises digital text responses to digital survey questions.

18. The system of claim 16, further comprising instructions that, when executed by the at least one processor, cause the system to identify segments by:

associating tokens for each word in the unstructured text;

generating a first token label identifying a start of a given segment of the plurality of segments; and generating a second token label identifying a portion of the given segment other than the start of the given segment.

19. The system of claim 16, wherein generating the sentiment label comprises one of: very positive, positive, neutral, negative, or very negative.

20. The system of claim 16, further comprising instructions that, when executed by the at least one processor, cause the system to:

determine a topic for each segment of the plurality of segments; and associate the topic for each segment with the sentiment label and the emotion label for each segment.

\* \* \* \* \*